(12) United States Patent
Irie et al.

(10) Patent No.: US 8,471,793 B2
(45) Date of Patent: Jun. 25, 2013

(54) LIQUID CRYSTAL DISPLAY DEVICE

(75) Inventors: Kentaro Irie, Osaka (JP); Masae Kitayama, Osaka (JP); Fumikazu Shimoshikiryoh, Osaka (JP); Toshihide Tsubata, Osaka (JP); Naoshi Yamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 827 days.

(21) Appl. No.: 12/451,092

(22) PCT Filed: Apr. 22, 2008

(86) PCT No.: PCT/JP2008/001055
§ 371 (c)(1),
(2), (4) Date: Oct. 26, 2009

(87) PCT Pub. No.: WO2008/139695
PCT Pub. Date: Nov. 20, 2008

(65) Prior Publication Data
US 2010/0118012 A1    May 13, 2010

(30) Foreign Application Priority Data

Apr. 27, 2007    (JP) ................. 2007-119169

(51) Int. Cl.
*G09G 3/36* (2006.01)
*G09G 5/00* (2006.01)
*G06F 3/033* (2006.01)

(52) U.S. Cl.
USPC ............................. 345/87; 345/96; 345/204

(58) Field of Classification Search
None
See application file for complete search history.

(56) References Cited

U.S. PATENT DOCUMENTS 5,182,549 A * 1/1993 Taniguchi et al. ............. 345/97
5,325,411 A * 6/1994 Orisaka ............................ 377/55

(Continued)

FOREIGN PATENT DOCUMENTS

CN   1932594       3/2007
EP   1 383 105 A2  1/2004

(Continued)

OTHER PUBLICATIONS

Internatiional Preliminary Report on Patentability date Nov. 19, 2009.

(Continued)

*Primary Examiner* — Amare Mengistu
*Assistant Examiner* — Antonio Xavier
(74) *Attorney, Agent, or Firm* — Harness, Dickey & Pierce, P.L.C.

(57) ABSTRACT

In a liquid crystal display device according to one embodiment of the present invention, when the polarities of the source signal voltages do not change over a plurality of horizontal scanning periods, the image write pulse of the gate signal supplied to a gate bus line that corresponds to pixels along the $j^{th}$ row rises before the source signal voltages change to values that correspond to pixels along the $j^{th}$ row. Next, the image write pulse of the gate signal supplied to a gate bus line that corresponds to pixels along the $j^{th}$ row falls, and then the image write pulse of the gate signal supplied to a gate bus line that corresponds to pixels along the $k^{th}$ row ($j \neq k$) rises. The polarities of the storage capacitor signal voltages applied to storage capacitor bus lines that correspond to sub-pixels of pixels along the $j^{th}$ row are inverted after the image write pulse of the gate signal supplied to a gate bus line that corresponds to pixels along the $k^{th}$ row rises.

29 Claims, 21 Drawing Sheets

U.S. PATENT DOCUMENTS

| | | | |
|---|---|---|---|
| 5,576,729 A * | 11/1996 | Yamazaki | 345/94 |
| 6,327,008 B1 * | 12/2001 | Fujiyoshi | 349/106 |
| 6,380,919 B1 * | 4/2002 | Koyama et al. | 345/92 |
| 6,724,452 B1 | 4/2004 | Takeda et al. | |
| 6,958,791 B2 | 10/2005 | Shimoshikiryo | |
| 7,079,214 B2 | 7/2006 | Shimoshikiryo | |
| 7,154,464 B2 | 12/2006 | Lee et al. | |
| 7,355,666 B2 | 4/2008 | Song et al. | |
| 2002/0000982 A1 * | 1/2002 | Takagi | 345/204 |
| 2002/0021274 A1 * | 2/2002 | Koyama et al. | 345/98 |
| 2002/0047822 A1 | 4/2002 | Senda et al. | |
| 2003/0227429 A1 * | 12/2003 | Shimoshikiryo | 345/90 |
| 2004/0012554 A1 | 1/2004 | Song et al. | |
| 2004/0119924 A1 | 6/2004 | Takeda et al. | |
| 2004/0207777 A1 * | 10/2004 | Hiroki et al. | 349/92 |
| 2005/0007329 A1 * | 1/2005 | Hiroki et al. | 345/92 |
| 2005/0077842 A1 * | 4/2005 | Boke et al. | 315/312 |
| 2005/0122441 A1 | 6/2005 | Shimoshikiryoh | |
| 2005/0166237 A1 | 7/2005 | Kawakami | |
| 2005/0213015 A1 | 9/2005 | Shimoshikiryo | |
| 2005/0264702 A1 | 12/2005 | Yoshii | |
| 2005/0280749 A1 | 12/2005 | Jung et al. | |
| 2006/0180813 A1 | 8/2006 | Kim et al. | |
| 2007/0018928 A1 * | 1/2007 | Ludden | 345/96 |
| 2007/0057297 A1 | 3/2007 | Kim | |
| 2007/0063952 A1 | 3/2007 | Oku et al. | |
| 2007/0164957 A1 * | 7/2007 | Hsieh et al. | 345/90 |
| 2007/0195157 A1 * | 8/2007 | Kasai | 347/253 |
| 2007/0201824 A1 | 8/2007 | Masaki et al. | |
| 2007/0201841 A1 | 8/2007 | Miura et al. | |
| 2007/0222733 A1 * | 9/2007 | Ju et al. | 345/98 |
| 2008/0084379 A1 * | 4/2008 | Takahashi et al. | 345/92 |
| 2008/0106657 A1 * | 5/2008 | Kitayama et al. | 349/37 |
| 2008/0106660 A1 | 5/2008 | Kitayama et al. | |
| 2008/0165298 A1 | 7/2008 | Song et al. | |
| 2009/0046048 A1 | 2/2009 | Shimoshikiryoh | |

FOREIGN PATENT DOCUMENTS

| | | |
|---|---|---|
| JP | 08-202317 | 8/1996 |
| JP | 11-242225 | 9/1999 |
| JP | 11-352938 | 12/1999 |
| JP | 2001-051252 | 2/2001 |
| JP | 2003-066928 | 3/2003 |
| JP | 2004-054295 | 2/2004 |
| JP | 2004-062146 | 2/2004 |
| JP | 2005-189804 | 7/2005 |
| JP | 2006-171342 | 6/2006 |
| JP | 2006-221182 | 8/2006 |
| WO | WO 2006/070829 | 7/2006 |
| WO | WO2006/098448 * | 9/2006 |

OTHER PUBLICATIONS

PCT Search Report for corresponding application for co-pending U.S. Appl. No. 12/451,074.

U.S. Office Action mailed Aug. 28, 2012 for U.S. Appl. No. 12/451,074.

* cited by examiner

FIG. 12
(a)
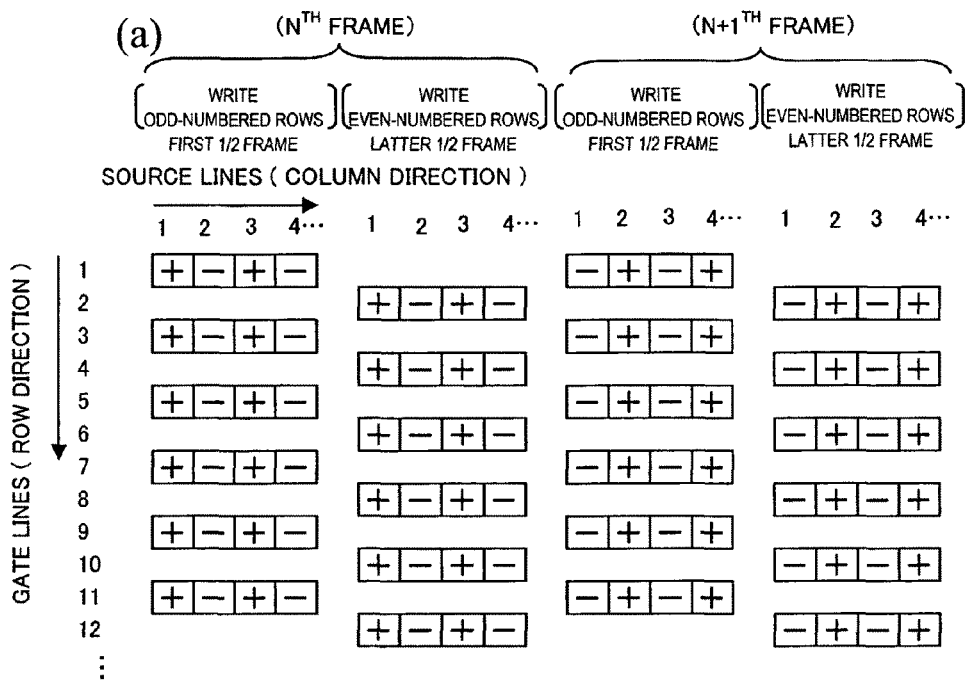
(b)
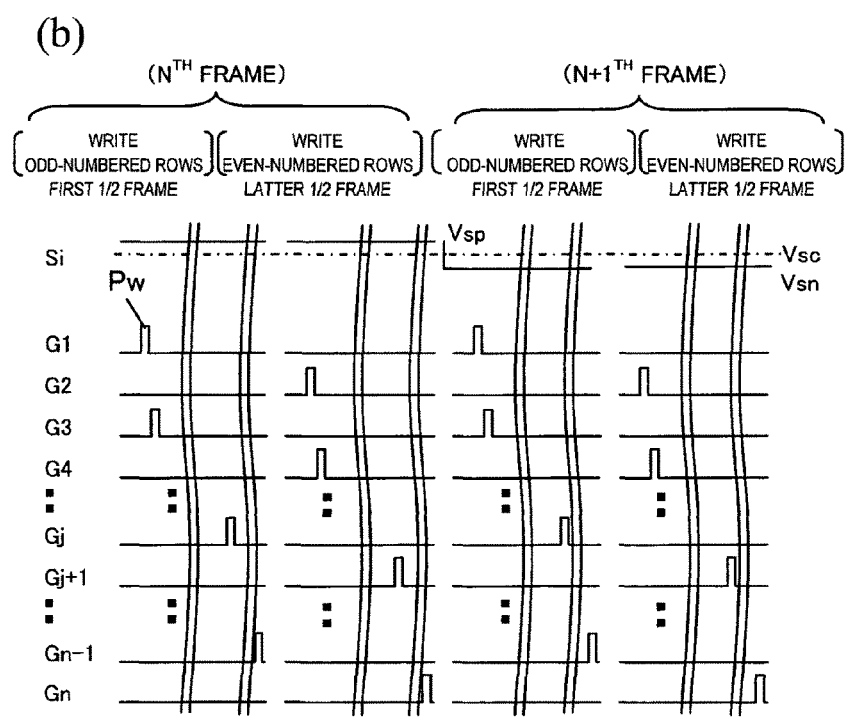

FIG. 13
(a)
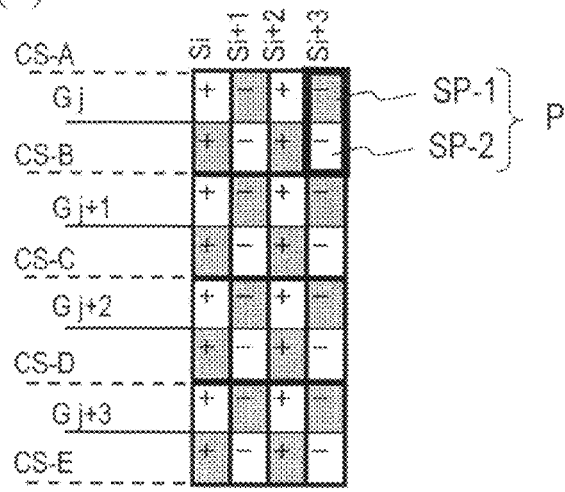
(b)
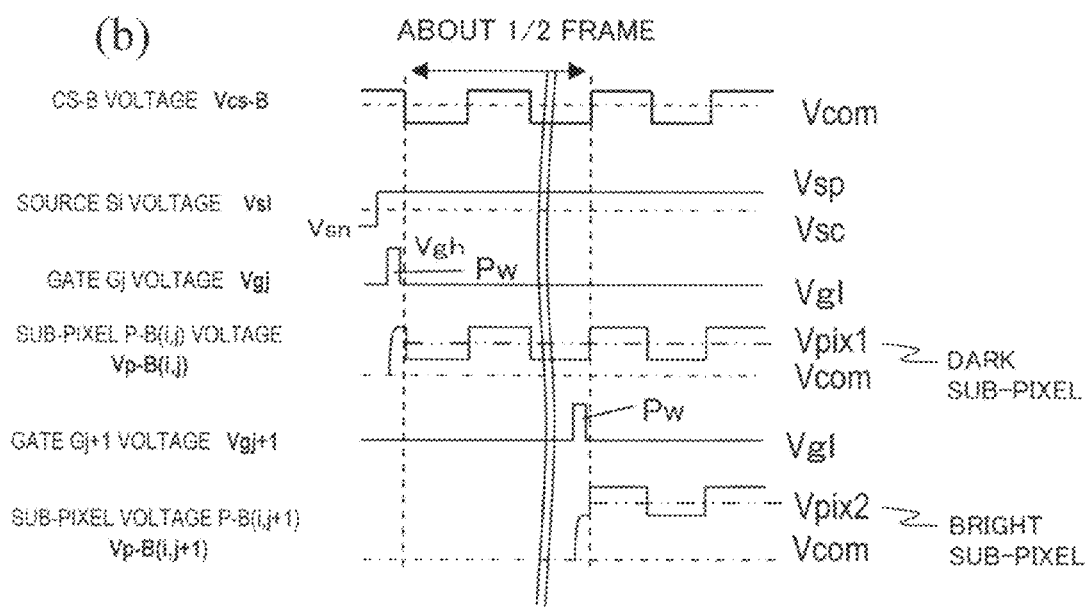

FIG.14
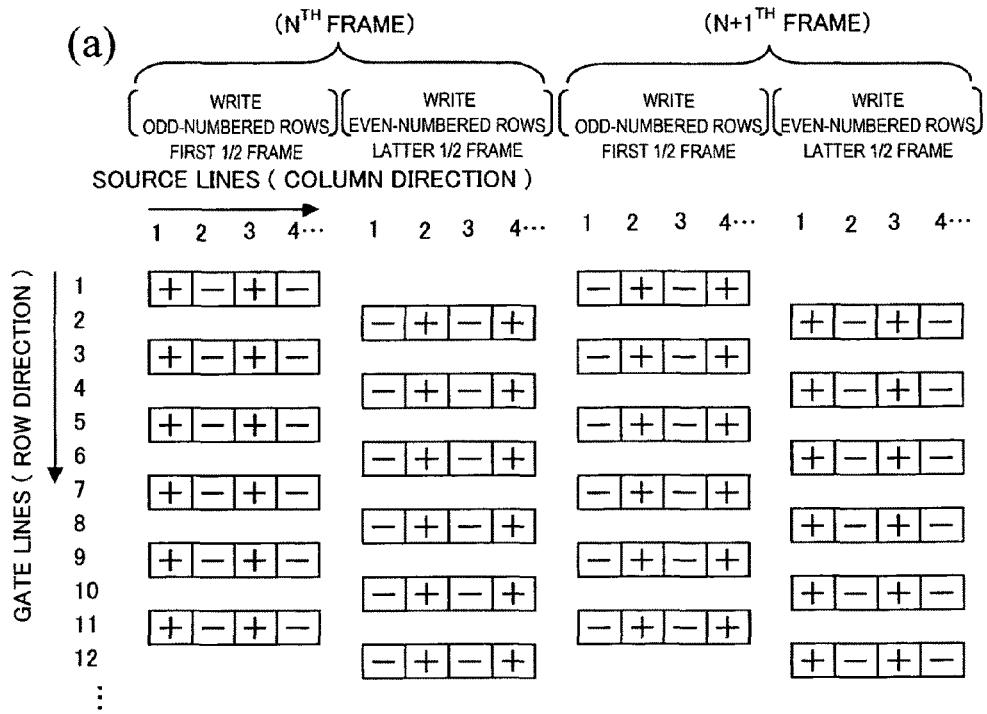
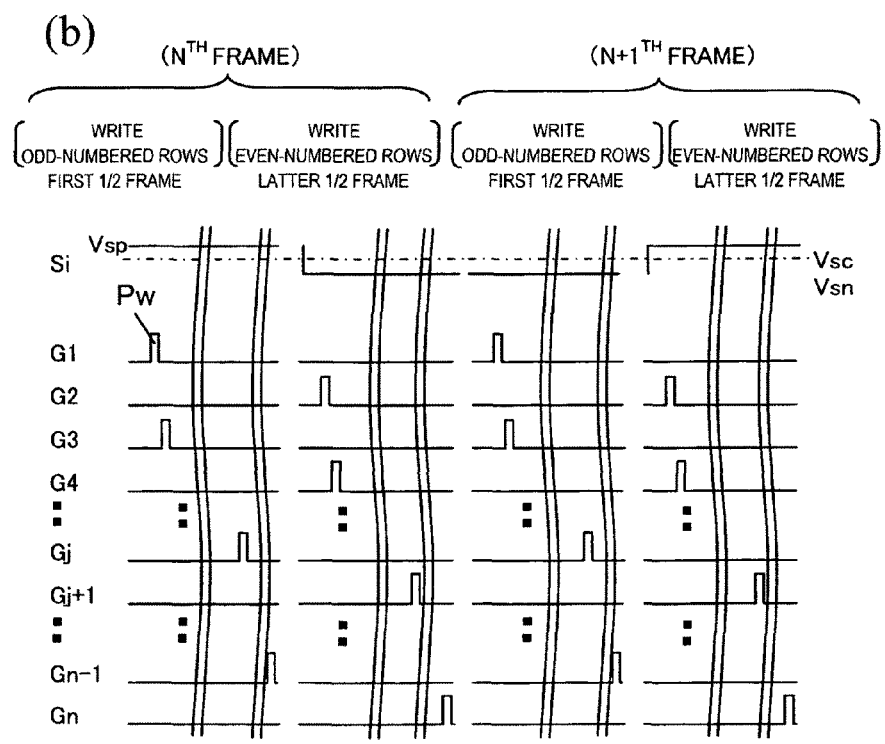

FIG. 15
(a)
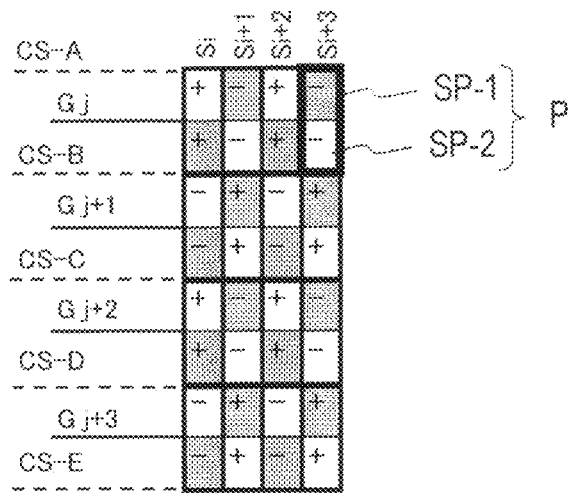
(b)
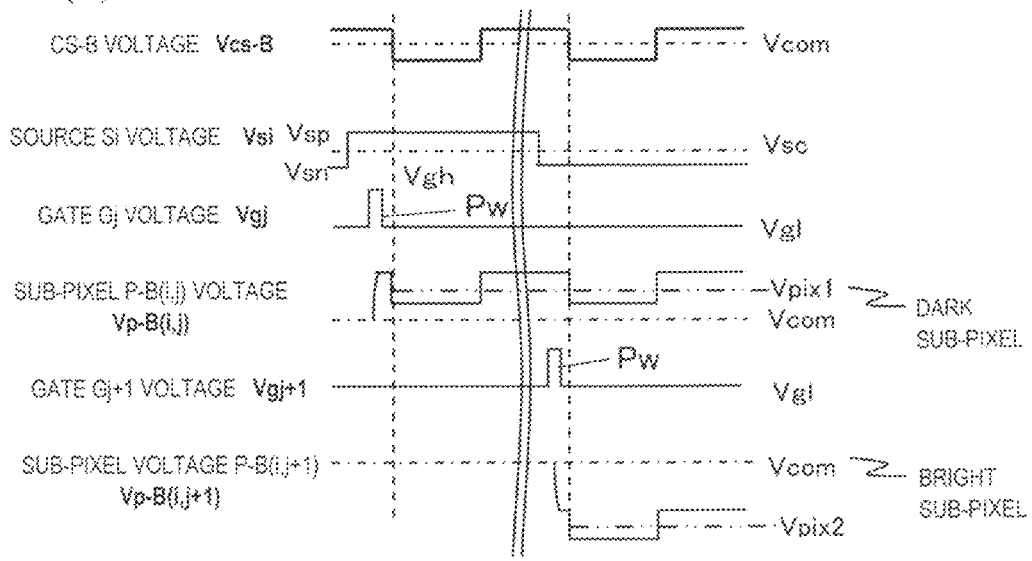

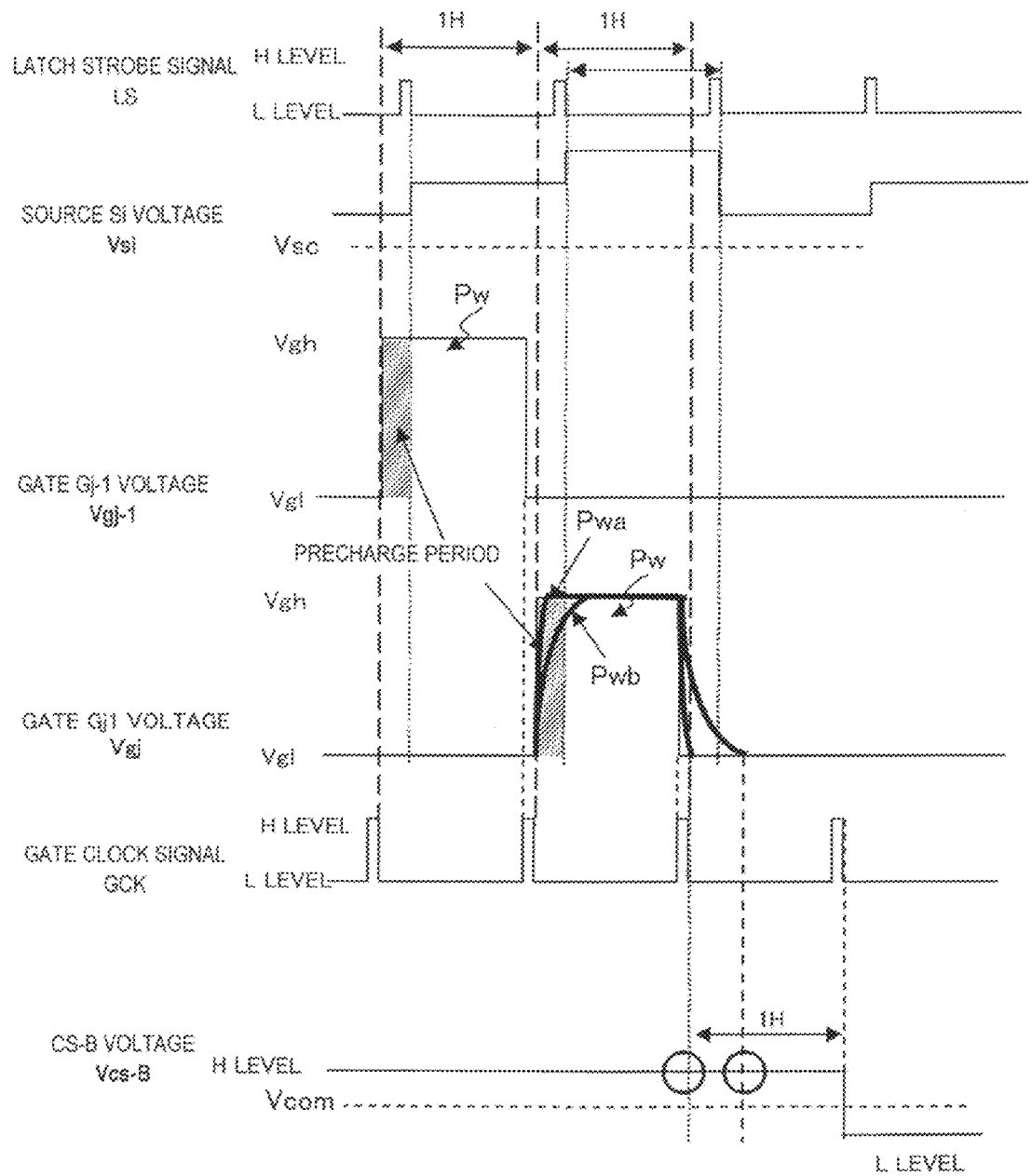

FIG.24
(a) Conventional Art
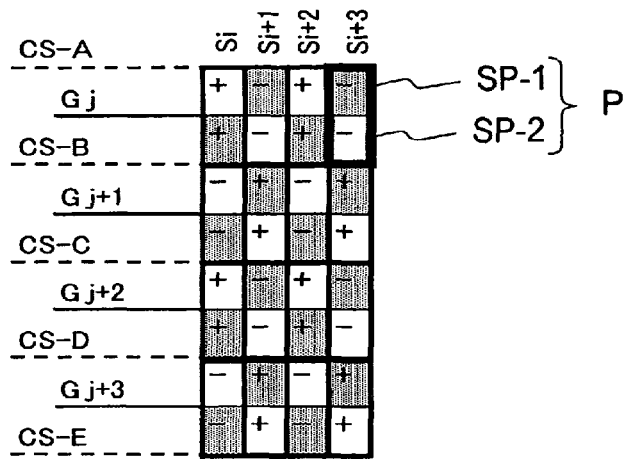
(b) Conventional Art
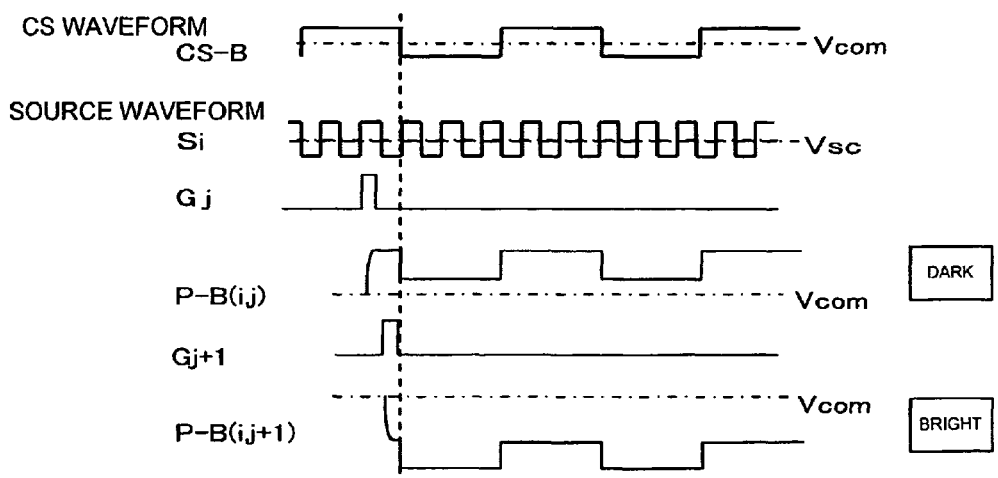

LIQUID CRYSTAL DISPLAY DEVICE

TECHNICAL FIELD

The present invention relates to a liquid crystal display device, and more particularly to a liquid crystal display device having a multi-pixel structure.

BACKGROUND ART

In recent years, as liquid crystal display devices with improved viewing angle characteristics, liquid crystal display devices of Multidomain Vertical Alignment mode (MVA mode) have been developed and used in liquid crystal TVs, etc. A liquid crystal display device of VA mode performs display in normally black mode by using a vertical alignment-type liquid crystal layer, in which liquid crystal molecules are aligned vertical to the substrate surface in the absence of an applied voltage, in combination with a pair of polarizing plates arranged in a crossed-Nicols state via the liquid crystal layer.

As described in Patent Document 1, a liquid crystal display device of MVA mode includes linear-shaped domain regulating means provided on both sides of a liquid crystal layer to thereby regulate the azimuth direction in which liquid crystal molecules incline in the presence of an applied voltage, thus forming, in one pixel, a plurality of domains (multidomain) whose azimuth directions of orientation of the liquid crystal molecules (director) are different from each other. Such a structure including, in each pixel, domains (regions) whose azimuth directions of orientation are different from each other is referred to also as an "orientation-divided structure". Four-domain structures are widely employed, in which four azimuth directions of orientation are arranged so that angles formed by polarization axes of polarizing plates arranged in a crossed-Nicols state are equally divided in two. By the employment of such orientation-divided structures, it is possible to achieve a wide viewing angle.

Furthermore, Patent Document 2 discloses a technique for improving the viewing angle dependence of γ characteristics of a liquid crystal display device of MVA mode. The γ characteristics represent the gray scale dependence of the display brightness, and the γ characteristics having viewing angle dependence means that the display brightness proportion with respect to the maximum brightness when an image of a certain gray level is viewed from the front differs from that when viewed obliquely. If the display brightness proportion with respect to the maximum brightness differs depending on the viewing direction, it presents a problem, especially when displaying images such as photographs or displaying television broadcasts and the like. The technique disclosed in Patent Document 2 is a technique whereby a first sub-pixel and a second sub-pixel included in each pixel exhibit different brightnesses from each other at least at a certain gray level, and it is referred to also as a pixel division technique or a multi-pixel technique. The structure of a liquid crystal display device in which each pixel includes such first and second sub-pixels is referred to also as a pixel division structure or a multi-pixel structure.

Now, referring to FIG. 23, a liquid crystal display device in MVA mode having a multi-pixel structure disclosed in Patent Document 2 will be described. FIG. 23 is a schematic view showing two of a plurality of pixels arranged in a matrix pattern including a plurality of rows and a plurality of columns, with the two pixels being adjacent to each other in the column direction.

Each pixel P of a liquid crystal display device 900 includes two sub-pixels (a first sub-pixel SP-1 and a second sub-pixel SP-2). Pixels along the $j^{th}$ row are associated with a gate bus line Gj, and pixels along the $i^{th}$ column are associated with a source bus line Si. The first sub-pixel SP-1 is associated with TFT-1, and the second sub-pixel SP-2 is associated with TFT-2. The gate electrodes of TFT-1 and TFT-2 are both connected to the common gate bus line Gj, and are turned ON/OFF by the same gate signal voltage. The source electrodes of TFT-1 and TFT-2 are both connected to the common source bus line Si, and when TFT-1 and TFT-2 are turned ON, a source signal voltage is supplied from the common source bus line Si to the first sub-pixel SP-1 and the second sub-pixel SP-2.

Each of the first sub-pixel SP-1 and the second sub-pixel SP-2 included in each pixel P includes a liquid crystal capacitor and a storage capacitor. A liquid crystal capacitor is formed by a sub-pixel electrode, a liquid crystal layer, and a counter electrode opposing the sub-pixel electrode via the liquid crystal layer. The storage capacitor is formed by a storage capacitor electrode electrically connected to the sub-pixel electrode, an insulating layer (e.g., a gate insulating layer), and a storage capacitor counter electrode opposing the storage capacitor electrode via the insulating layer. The storage capacitor electrode may be the sub-pixel electrode itself. The storage capacitor counter electrode may be a part of a CS bus line (referred to also as a storage capacitor bus line or a storage capacitor line), or may be formed integrally with a CS bus line. In FIG. 23, each sub-pixel electrode is connected to the drain electrode of the corresponding TFT, and is arranged so as to partially overlap with the corresponding CS bus line, thereby forming the storage capacitor thereof.

The first sub-pixel SP-1 of a pixel along the $j^{th}$ row is associated with a CS bus line CS-A, and the second sub-pixel SP-2 of a pixel along the $j^{th}$ row is associated with a CS bus line CS-B. The CS bus lines CS-A and CS-B are electrically independent of each other. Therefore, by controlling the CS voltages (referred to also as storage capacitor signal voltages) supplied from the CS bus lines CS-A and CS-B, the brightness exhibited by the first sub-pixel SP-1 may be made different from the brightness exhibited by the second sub-pixel SP-2, as shown below.

For example, an image write pulse (gate ON pulse) of a gate signal supplied to the gate bus line Gj rises, and a source signal voltage having a positive polarity is supplied to the pixel at $j^{th}$ row, $i^{th}$ column. When the source signal voltage of the positive polarity is supplied, the potential of the sub-pixel electrode becomes higher than the counter electrode, thus making this sub-pixel positive. In contrast, when a source signal voltage having a negative polarity is supplied, the potential of the sub-pixel electrode becomes lower than the counter electrode, thus making this sub-pixel negative.

The image write pulse of the gate signal supplied to the gate bus line Gj rises, thereby turning ON TFT-1 and TFT-2, and supplying the source signal voltage having the positive polarity to the pixel at $j^{th}$ row, $i^{th}$ column. At this point, the voltage of the liquid crystal capacitor of the first sub-pixel SP-1 is generally equal to the voltage of the liquid crystal capacitor of the second sub-pixel SP-2. Then, the image write pulse of the gate signal supplied to the gate bus line Gj falls, thereby turning OFF TFT-1 and TFT-2.

Next, a control is performed so that the first change of the CS voltage supplied from the CS bus line CS-A to the storage capacitor of the first sub-pixel SP-1 after TFT-1 is turned OFF is an increase, and the first change of the CS voltage supplied from the CS bus line CS-B to the storage capacitor of the second sub-pixel SP-2 after the TFT-2 is turned OFF is a decrease. That is, CS voltages having such waveforms are supplied from the CS bus line CS-A and the CS bus line CS-B. With the positive polarity source signal voltage being supplied to the first sub-pixel SP-1, when the CS voltage supplied from the CS bus line CS-A increases after TFT-1 is turned OFF, the voltage of the liquid crystal capacitor of the first sub-pixel SP-1 increases due to an up-thrusting effect. Therefore, the first sub-pixel SP-1 becomes a bright sub-pixel, which exhibits a higher brightness than that corresponding to the supplied source signal voltage. On the other hand, when the CS voltage supplied from the CS bus line CS-B decreases after TFT-2 is turned OFF, the voltage of the liquid crystal capacitor of the second sub-pixel SP-2 decreases due to a down-thrusting effect. Therefore, the second sub-pixel SP-2 becomes a dark sub-pixel, which exhibits a lower brightness than that corresponding to the supplied source signal voltage. As described above, the viewing angle dependence of the $\gamma$ characteristics can be improved by displaying a brightness corresponding to the supplied voltage as an average (area average) of two different brightnesses, i.e., by combining different voltage-brightness characteristics (referred to also as the "V-T characteristics") of two sub-pixels over each other.

A liquid crystal display device having the multi-pixel structure described above uses, as the CS voltage, a voltage having a waveform portion that oscillates with a constant cycle (hereinafter also referred to simply as an "oscillating voltage"). As the size of a liquid crystal display device increases, the load capacitance and resistance of the CS bus line increase. Therefore, the waveform blunting of the CS voltage may vary depending on the position in the display area, and the display brightness may thus be dependent on the position in the display area, thereby causing brightness non-uniformity. Patent Document 3 discloses a liquid crystal display device in which the oscillation cycle of the CS voltage is elongated to thereby suppress/prevent the occurrence of brightness non-uniformity.

Now, referring to FIG. 24 and FIG. 25, the liquid crystal display device disclosed in Patent Document 3 will be described.

FIG. 24(a) is a schematic diagram showing the connections between sub-pixels and CS bus lines, and the polarity and the bright/dark status of each sub-pixel, in the liquid crystal display device disclosed in Patent Document 3. A hatched sub-pixel is a dark sub-pixel, and an unhatched sub-pixel is a bright sub-pixel. A positive polarity sub-pixel is denoted by "+", and a negative polarity sub-pixel by "−". FIG. 24(b) shows waveforms of signal voltages in the liquid crystal display device, including, in this order from the top: the CS voltage supplied from the CS bus line CS-B; the source signal voltage supplied to the source bus line Si of the $i^{th}$ column; the gate signal voltage supplied to the gate bus line Gj of the $j^{th}$ row; the voltage applied to one of two sub-pixels included in a pixel corresponding to the source bus line Si of the $i^{th}$ column and the gate bus line Gj of the $j^{th}$ row that has the storage capacitor connected to the CS bus line CS-B, i.e., the sub-pixel P-B(i,j); the gate signal voltage supplied to the gate bus line Gj+1 of the j+1$^{th}$ row; and the voltage applied to one of two sub-pixels of a pixel corresponding to the source bus line Si of the $i^{th}$ column and the gate bus line Gj+1 of the j+1$^{th}$ row that has the storage capacitor connected to the CS bus line CS-B, i.e., the sub-pixel P-B(i,j+1). In the figure, Vcom denotes the counter voltage. Note that the amplitude of the source signal voltage is shown to be constant so as not to overly complicate the description.

As shown in FIG. 24(a), one pixel, e.g., the pixel at $j^{th}$ row, $i^{th}$ column, which is associated with the source bus line Si and the gate bus line Gj, includes a sub-pixel associated with the CS bus line CS-A (it may be designated as "P-A(i,j)") and a sub-pixel associated with the CS bus line CS-B (it may be designated as "P-B(i,j)"). The pixel at j+1$^{th}$ row, $i^{th}$ column, which is associated with the source bus line Si and the gate bus line Gj+1, includes a sub-pixel associated with the CS bus line CS-B (it may be designated as "P-B(i,j+1)") and a sub-pixel associated with the CS bus line CS-C (it may be designated as "P-C(i,j+1)"). That is, in the configuration shown in FIG. 24(a), the CS bus line CS-B is commonly associated with two sub-pixels that belong to different pixels and are adjacent to each other in the column direction. As described above, a CS bus line arranged between pixels adjacent to each other in the column direction is commonly associated with two sub-pixels that belong to different pixels and are adjacent to each other in the column direction.

When signal voltages having waveforms shown in FIG. 24(b) are applied, the polarity and the bright/dark status of the sub-pixels are as shown in FIG. 24(a). Herein, dot inversion driving is used so that pixels adjacent to each other in the row direction and the column direction have inverted polarities, and so that bright sub-pixels and dark sub-pixels each form a checkered pattern.

Since a source signal voltage having a positive polarity is supplied to the source bus line Si when the gate signal voltage of the gate bus line Gj is at a high level, the voltage of the sub-pixel P-B(i,j) is positive. Since the first change of the oscillating voltage of the CS bus line CS-B after the gate signal voltage of the gate bus line Gj transitions to a low level is a decrease, the voltage of the sub-pixel P-B(i,j) decreases due to a down-thrusting effect. On the other hand, since the signal voltage of the source bus line Si when the gate signal voltage of the gate bus line Gj+1 is at a high level is negative, the voltage of the sub-pixel P-B(i,j+1) is negative. Since the first change of the oscillating voltage of the CS bus line CS-B after the gate signal voltage of the gate bus line Gj+1 transitions to a low level is a decrease, the voltage of the sub-pixel P-B(i,j+1) decreases due to a down-thrusting effect. At this point, since the voltage of the sub-pixel P-B(i,j+1) is negative, the absolute value of the voltage increases. Therefore, the sub-pixel P-B(i,j) is a dark sub-pixel, and the sub-pixel P-B(i,j+1) is a bright sub-pixel.

FIG. 25(a) is a schematic diagram showing the polarities of source signal voltages supplied to different pixels over two consecutive frames (the $N^{th}$ frame and the N+1$^{th}$ frame). FIG. 25(b) is a schematic diagram showing the order in which pixels are scanned and the source signal voltage during the scanning over two consecutive frames, showing the waveform of the source signal voltage supplied to the source bus line Si of the $i^{th}$ column and the waveforms of the gate signal voltages supplied to the gate bus lines G1 to Gn of the 1$^{st}$ row to the n$^{th}$ row. A plurality of pixels forming the display area of the liquid crystal display device are successively scanned by the gate signal voltages supplied respectively to the gate bus lines G.

By the dot inversion driving method, source signal voltages of opposite polarities are supplied to pixels that are adjacent to each other in the column direction or the row direction in each of the $N^{th}$ frame and the N+1$^{th}$ frame, as shown in FIG. 25(a). A so-called frame inversion is also used, whereby the polarities of voltages applied to all pixels are inverted between the $N^{th}$ frame and the N+1$^{th}$ frame.

With such dot inversion driving, the gate bus lines G1 to Gn are successively selected starting from one end (herein the upper end) of the display area, and pixels are successively selected row by row, both in the $N^{th}$ frame and in the N+1$^{th}$ frame, as shown in FIG. 25(b). The source signal voltage supplied to the source bus line Si has a waveform in which the polarity is switched every horizontal scanning period (designated as "1H"), and if the brightness of a pixel corresponding to the source bus line Si does not change over two consecutive frames (the $N^{th}$ frame and the $N+1^{th}$ frame), the phase of the waveform of the source signal voltage during the $N^{th}$ frame is shifted by 1H from that during the $N+1^{th}$ frame since the amplitude of the source signal voltage remains equal. Although not shown in the figure, the phase of the waveform of the source signal voltage supplied to the source bus line Si+1, which is adjacent to the source bus line Si in the row direction, is shifted by 1H from that of the waveform of the source signal voltage supplied to the source bus line Si. The entire disclosures of Patent Documents 1 to 3 are herein incorporated by reference.

On the other hand, a precharge driving method is known (see, for example, Patent Documents 4 and 5) as a technique for suppressing non-uniformity in the charging of pixel electrodes. With the precharge driving method disclosed in Patent Documents 4 and 5, where the polarity of the source signal voltage is not inverted over a plurality of horizontal scanning periods, a pixel along the $j^{th}$ row is charged in advance by applying a source signal voltage of a value corresponding to a pixel along the $j-1^{th}$ row to the pixel along the $j^{th}$ row before the source signal voltage changes to a value corresponding to the pixel along the $j^{th}$ row, for example, thereby suppressing the charging non-uniformity.

[Patent Document 1] Japanese Laid-Open Patent Publication No. 11-242225

[Patent Document 2] Japanese Laid-Open Patent Publication No. 2004-62146

[Patent Document 3] Japanese Laid-Open Patent Publication No. 2005-189804

[Patent Document 4] Japanese Laid-Open Patent Publication No. 2001-51252

[Patent Document 5] Japanese Laid-Open Patent Publication No. 2003-66928

DISCLOSURE OF INVENTION

Problems to be Solved by the Invention

The present inventors found that simply applying a precharge driving method to a multi-pixel technique may result in bright/dark inversions of sub-pixels, whereby a sub-pixel which is supposed to be a bright sub-pixel becomes a dark sub-pixel whereas a sub-pixel which is supposed to be a dark sub-pixel becomes a bright sub-pixel, thus lowering the display quality.

The present invention has been made in view of the above problems, and an objective thereof is to provide a liquid crystal display device in which the occurrence of bright/dark inversions is suppressed.

Means for Solving the Problems

A liquid crystal display device according to the present invention comprises: a plurality of pixels arranged in a matrix pattern of a plurality of rows and a plurality of columns, each pixel including a first sub-pixel and a second sub-pixel capable of exhibiting different brightnesses at least at a certain gray level; a plurality of source bus lines each associated with pixels along one of the plurality of columns; a plurality of gate bus lines each associated with pixels along one of the plurality of rows; a plurality of TFTs each associated with at least one of the first sub-pixel and the second sub-pixel of one of the plurality of pixels; and a plurality of storage capacitor bus lines each associated at least with one of the first sub-pixel and the second sub-pixel of each pixel along one of the plurality of rows, wherein each of the first sub-pixel and the second sub-pixel includes a liquid crystal capacitor and a storage capacitor; a storage capacitor bus line associated with the storage capacitor of the first sub-pixel of one of the plurality of pixels is electrically independent of a storage capacitor bus line associated with the storage capacitor of the second sub-pixel of the pixel; if polarities of source signal voltages applied to the plurality of source bus lines do not change over a plurality of horizontal scanning periods, an image write pulse of a gate signal supplied to a gate bus line that corresponds to pixels along a $j^{th}$ row rises before the source signal voltages applied to the plurality of source bus lines change to values that correspond to pixels along the $j^{th}$ row; after the source signal voltages change to values that correspond to pixels along the $j^{th}$ row, the image write pulse of the gate signal supplied to a gate bus line that corresponds to pixels along the $j^{th}$ row falls, and then the image write pulse of the gate signal supplied to a gate bus line that corresponds to pixels along a $k^{th}$ row ($j \neq k$) to be scanned next rises; and polarities of storage capacitor signal voltages applied to storage capacitor bus lines that correspond to sub-pixels of pixels along the $j^{th}$ row are inverted after the image write pulse of the gate signal supplied to a gate bus line that corresponds to pixels along the $k^{th}$ row rises, instead of in synchronism with the rise of the image write pulse of the gate signal supplied to the gate bus line that corresponds to pixels along the $k^{th}$ row. Note that "in synchronism with" as used herein means that two signals change at the same timing. This is true also in the description below.

In one embodiment, an image write pulse of a gate signal of a corresponding one of the plurality of gate bus lines rises in synchronism with a fall of a pulse of a gate clock signal, and the image write pulse falls in synchronism with a rise of the next pulse of the gate clock signal.

In one embodiment, the polarities of the storage capacitor signal voltages are inverted in synchronism with a data clock signal having a higher frequency than the gate clock signal.

In one embodiment the liquid crystal display device further comprises a counting circuit for counting the number of pulses of the data clock signal, wherein the polarities of the storage capacitor signal voltages are inverted based on the number of pulses of the data clock signal, which has been counted by the counting circuit since the fall of the next pulse of the gate clock signal.

In one embodiment, the source signal voltages change in synchronism with a fall of a pulse of a latch strobe signal; and a fall of the pulse of the gate clock signal in synchronism with the rise of the image write pulse of the gate signal corresponding to pixels along the $j^{th}$ row is prior to the fall of the pulse of the latch strobe signal in synchronism with the change of the source signal voltages to values that correspond to pixels along the $j^{th}$ row.

In one embodiment, the polarities of the storage capacitor signal voltages applied to storage capacitor bus lines that correspond to sub-pixels of pixels along the $j^{th}$ row are inverted in synchronism with the fall of the pulse of the latch strobe signal in synchronism with the change of the source signal voltages to values that correspond to pixels along the $k^{th}$ row.

In one embodiment, the polarities of the storage capacitor signal voltages are inverted in synchronism with a pulse subsequent to the next pulse of the gate clock signal.

In one embodiment, at least one of the plurality of storage capacitor bus lines is associated with the first sub-pixel of each pixel along a certain one of the plurality of rows and the second sub-pixel of each pixel along another row that is adjacent in a column direction to the certain row.

In one embodiment, the $k^{th}$ row is a $j+1^{th}$ row.

In one embodiment, the $k^{th}$ row is a $j+2^{th}$ row.

In one embodiment, the storage capacitor signal voltage supplied to each of the plurality of storage capacitor bus lines has such a waveform that the polarity thereof changes at least once within one vertical scanning period; the vertical scanning period includes a plurality of sub-vertical scanning periods; and the plurality of sub-vertical scanning periods include: a first sub-vertical scanning period in which interlaced scanning is performed so that either one of pixels along odd-numbered rows and pixels along even-numbered rows are scanned successively; and a second sub-vertical scanning period in which interlaced scanning is performed so that the other one of the pixels along odd-numbered rows and the pixels along even-numbered rows are scanned successively after the first sub-vertical scanning period.

In one embodiment, the polarity of the source signal voltage supplied to each of the plurality of source bus lines changes in a predetermined sequence, wherein the sequence includes two consecutive vertical scanning periods differing from each other in terms of the polarity of the source signal voltage or two consecutive sub-vertical scanning periods differing from each other in terms of the polarity of the source signal voltage; and the storage capacitor signal voltage has such a waveform that an effect of increasing or decreasing an effective voltage of one of two sub-pixels of a pixel connected to a $j^{th}$ gate bus line selected in the first sub-vertical scanning period that is associated with the storage capacitor bus line to which the storage capacitor signal voltage is supplied is opposite to an effect of increasing or decreasing an effective voltage of one of two sub-pixels of a pixel connected to a $j+1^{th}$ gate bus line selected in the second sub-vertical scanning period that is associated with the storage capacitor bus line to which the storage capacitor signal voltage is supplied.

In one embodiment, the sequence of the source signal voltage includes two consecutive vertical scanning periods differing from each other in terms of the polarity of the source signal voltage, and the first sub-vertical scanning period and the second sub-vertical scanning period, which belong to the same vertical scanning period, are the same in terms of the polarity of the source signal voltage; and the polarity of the storage capacitor signal voltage changes an odd number of times during a period from a point in time when a gate signal voltage supplied to the $j^{th}$ gate bus line changes from a high level to a low level in the first sub-vertical scanning period until a point in time when a gate signal voltage supplied to the $j+1^{th}$ gate bus line changes from the high level to the low level in the second sub-vertical scanning period.

In one embodiment, the sequence of the source signal voltage includes two consecutive sub-vertical scanning periods differing from each other in terms of the polarity of the source signal voltage, and the first sub-vertical scanning period and the second sub-vertical scanning period, which belong to the same vertical scanning period, differ from each other in terms of the polarity of the source signal voltage; and the polarity of the storage capacitor signal voltage changes an even number of times during a period from a point in time when a gate signal voltage supplied to the $j^{th}$ gate bus line changes from a high level to a low level in the first sub-vertical scanning period until a point in time when a gate signal voltage supplied to the $j+1^{th}$ gate bus line changes from the high level to the low level in the second sub-vertical scanning period.

A liquid crystal display device according to the present invention comprises: a plurality of pixels arranged in a matrix pattern of a plurality of rows and a plurality of columns, each pixel including a first sub-pixel and a second sub-pixel capable of exhibiting different brightnesses at least at a certain gray level; a plurality of source bus lines each associated with pixels along one of the plurality of columns; a plurality of gate bus lines each associated with pixels along one of the plurality of rows; a plurality of TFTs each associated with at least one of the first sub-pixel and the second sub-pixel of one of the plurality of pixels; and a plurality of storage capacitor bus lines each associated at least with one of the first sub-pixel and the second sub-pixel of each pixel along one of the plurality of rows, wherein each of the first sub-pixel and the second sub-pixel includes a liquid crystal capacitor and a storage capacitor; a storage capacitor bus line associated with the storage capacitor of the first sub-pixel of one of the plurality of pixels is electrically independent of a storage capacitor bus line associated with the storage capacitor of the second sub-pixel of the pixel; if polarities of source signal voltages applied to the plurality of source bus lines do not change over a plurality of horizontal scanning periods, an image write pulse of a gate signal supplied to a gate bus line that corresponds to pixels along a $j^{th}$ row rises before the source signal voltages applied to the plurality of source bus lines change to values that correspond to pixels along the $j^{th}$ row; after the source signal voltages change to values that correspond to pixels along the $j^{th}$ row, the image write pulse of the gate signal supplied to a gate bus line that corresponds to pixels along the $j^{th}$ row falls, and then the source signal voltages change from values that correspond to pixels along the $j^{th}$ row to values that correspond to pixels along a $k^{th}$ row ($j \neq k$); and polarities of storage capacitor signal voltages applied to storage capacitor bus lines that correspond to sub-pixels of pixels along the $j^{th}$ row are inverted in synchronism with, or subsequent to, a timing at which the source signal voltages start changing from values that correspond to pixels along the $j^{th}$ row to values that correspond to pixels along the $k^{th}$ row.

In one embodiment, an image write pulse of a gate signal of a corresponding one of the plurality of gate bus lines rises in synchronism with a fall of a pulse of a gate clock signal, and the image write pulse falls in synchronism with a rise of the next pulse of the gate clock signal.

In one embodiment, the polarities of the storage capacitor signal voltages are inverted in synchronism with a data clock signal having a higher frequency than the gate clock signal.

In one embodiment, the liquid crystal display device further comprises a counting circuit for counting the number of pulses of the data clock signal, wherein the polarities of the storage capacitor signal voltages are inverted based on the number of pulses of the data clock signal, which has been counted by the counting circuit since the fall of the next pulse of the gate clock signal.

In one embodiment, the source signal voltages change in synchronism with a fall of a pulse of a latch strobe signal; a fall of the pulse of the gate clock signal in synchronism with the rise of the image write pulse of the gate signal corresponding to pixels along the $j^{th}$ row is prior to the fall of the pulse of the latch strobe signal in synchronism with the change of the source signal voltages to values that correspond to pixels along the $j^{th}$ row.

In one embodiment, the polarities of the storage capacitor signal voltages applied to storage capacitor bus lines that correspond to sub-pixels of pixels along the $j^{th}$ row are inverted in synchronism with the fall of the pulse of the latch strobe signal in synchronism with the change of the source signal voltages to values that correspond to pixels along the $k^{th}$ row.

In one embodiment, the polarities of the storage capacitor signal voltages are inverted in synchronism with a pulse subsequent to the next pulse of the gate clock signal.

In one embodiment, at least one of the plurality of storage capacitor bus lines is associated with the first sub-pixel of each pixel along a certain one of the plurality of rows and the second sub-pixel of each pixel along another row that is adjacent in a column direction to the certain row.

In one embodiment, the $k^{th}$ row is a $j+1^{th}$ row.

In one embodiment, the $k^{th}$ row is a $j+2^{th}$ row.

In one embodiment, the storage capacitor signal voltage supplied to each of the plurality of storage capacitor bus lines has such a waveform that the polarity thereof changes at least once within one vertical scanning period; the vertical scanning period includes a plurality of sub-vertical scanning periods; and the plurality of sub-vertical scanning periods include: a first sub-vertical scanning period in which interlaced scanning is performed so that either one of pixels along odd-numbered rows and pixels along even-numbered rows are scanned successively; and a second sub-vertical scanning period in which interlaced scanning is performed so that the other one of the pixels along odd-numbered rows and the pixels along even-numbered rows are scanned successively after the first sub-vertical scanning period.

In one embodiment, the polarity of the source signal voltage supplied to each of plurality of source bus lines changes in a predetermined sequence, wherein the sequence includes two consecutive vertical scanning periods differing from each other in terms of the polarity of the source signal voltage or two consecutive sub-vertical scanning periods differing from each other in terms of the polarity of the source signal voltage; and the storage capacitor signal voltage has such a waveform that an effect of increasing or decreasing an effective voltage of one of two sub-pixels of a pixel connected to a $j^{th}$ gate bus line selected in the first sub-vertical scanning period that is associated with the storage capacitor bus line to which the storage capacitor signal voltage is supplied is opposite to an effect of increasing or decreasing an effective voltage of one of two sub-pixels of a pixel connected to a $j+1^{th}$ gate bus line selected in the second sub-vertical scanning period that is associated with the storage capacitor bus line to which the storage capacitor signal voltage is supplied.

In one embodiment, the sequence of the source signal voltage includes two consecutive vertical scanning periods differing from each other in terms of the polarity of the source signal voltage, and the first sub-vertical scanning period and the second sub-vertical scanning period, which belong to the same vertical scanning period, are the same in terms of the polarity of the source signal voltage; and the polarity of the storage capacitor signal voltage changes an odd number of times during a period from a point in time when a gate signal voltage supplied to the $j^{th}$ gate bus line changes from a high level to a low level in the first sub-vertical scanning period until a point in time when a gate signal voltage supplied to the $j+1^{th}$ gate bus line changes from the high level to the low level in the second sub-vertical scanning period.

In one embodiment, the sequence of the source signal voltage includes two consecutive sub-vertical scanning periods differing from each other in terms of the polarity of the source signal voltage, and the first sub-vertical scanning period and the second sub-vertical scanning period, which belong to the same vertical scanning period, differ from each other in terms of the polarity of the source signal voltage; and the polarity of the storage capacitor signal voltage changes an even number of times during a period from a point in time when a gate signal voltage supplied to the $j^{th}$ gate bus line changes from a high level to a low level in the first sub-vertical scanning period until a point in time when a gate signal voltage supplied to the $j+1^{th}$ gate bus line changes from the high level to the low level in the second sub-vertical scanning period.

A television set of the present invention comprises a liquid crystal display device as set forth above.

Effects of the Invention

According to the present invention, it is possible to provide a liquid crystal display device in which a precharge driving method is applied to a multi-pixel technique, and in which the occurrence of bright/dark inversions is suppressed.

BRIEF DESCRIPTION OF DRAWINGS

FIG. 12 (a) is a schematic diagram showing the order in which pixels are scanned over two consecutive frames and the polarities of the source signal voltages corresponding to the pixels in the liquid crystal display device of Embodiment 2, and (b) is a timing diagram showing the source signal voltage supplied to the source bus line Si and the gate signal voltages supplied to the gate bus lines G1 to Gn over two consecutive frames.

FIG. 13 (a) is a schematic diagram showing the polarity and the bright/dark status of sub-pixels of four rows and four columns of pixels in the second embodiment of the liquid crystal display device according to the present invention, and (b) is a timing diagram showing the CS voltage Vcs-B, the source signal voltage Vsi, the gate signal voltage Vgj, the voltage Vp-B(i,j) of the sub-pixel P-B(i,j), the gate signal voltage Vgj+1, and the voltage Vp-B(i,j+1) of the sub-pixel P-B(i,j+1).

FIG. 14 (a) is a schematic diagram showing the order in which pixels are scanned over two consecutive frames and the polarities of the source signal voltages corresponding to the pixels in the liquid crystal display device of Embodiment 3, and (b) is a timing diagram showing the source signal voltage supplied to the source bus line Si and the gate signal voltages supplied to the gate bus lines G1 to Gn over two consecutive frames.

FIG. 15 (a) is a schematic diagram showing the polarity and the bright/dark status of sub-pixels of four rows and four columns of pixels in the third embodiment of the liquid crystal display device according to the present invention, and (b) is a timing diagram showing the CS voltage Vcs-B, the source signal voltage Vsi, the gate signal voltage Vgj, the voltage Vp-B(i,j) of the sub-pixel P-B(i,j), the gate signal voltage Vgj+1, and the voltage Vp-B(i,j+1) of the sub-pixel P-B(i,j+1).

FIG. 17 A timing diagram showing the latch strobe signal LS, the source signal voltage Vsi, the gate signal voltages Vgj−1 and Vgj, the gate clock signal GCK and the CS voltage Vcs-B in the fifth embodiment of the liquid crystal display device according to the present invention.

FIG. 24 (a) is a schematic diagram showing the connections between sub-pixels and CS bus lines, and the polarity and the bright/dark status of each sub-pixel, in the conventional liquid crystal display device, and (b) is a schematic diagram showing waveforms of signal voltages in the liquid crystal display device.

DESCRIPTION OF THE REFERENCE NUMERALS

Figure 1:
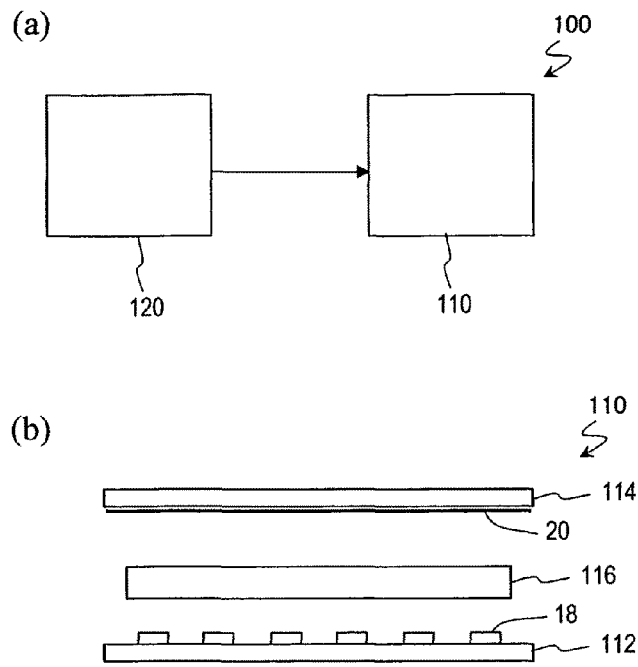
FIG. 1 (a) is a schematic diagram showing a first embodiment of a liquid crystal display device according to the present invention, and (b) is a schematic diagram of a liquid crystal panel in the liquid crystal display device of Embodiment 1.

100 Liquid crystal display device
110 Liquid crystal panel
120 Driver
130 Gate driver
140 Source driver
150 Storage capacitor signal control driver (CS control circuit)
160 Display control circuit
300 Television set

BEST MODE FOR CARRYING OUT THE INVENTION

Now, referring to the drawings, embodiments of the liquid crystal display device according to the present invention will be described. Note that the present invention is not limited to the following embodiments.

Embodiment 1

Referring to FIG. 1 to FIG. 11, a first embodiment of the liquid crystal display device according to the present invention will be described.

First, FIG. 1(a) shows a schematic diagram of a liquid crystal display device 100 of the present embodiment. The liquid crystal display device 100 includes a liquid crystal panel 110 and a driver 120, the liquid crystal panel 110 having a plurality of pixels arranged in a matrix pattern of a plurality of rows and a plurality of columns.

Figure 23:
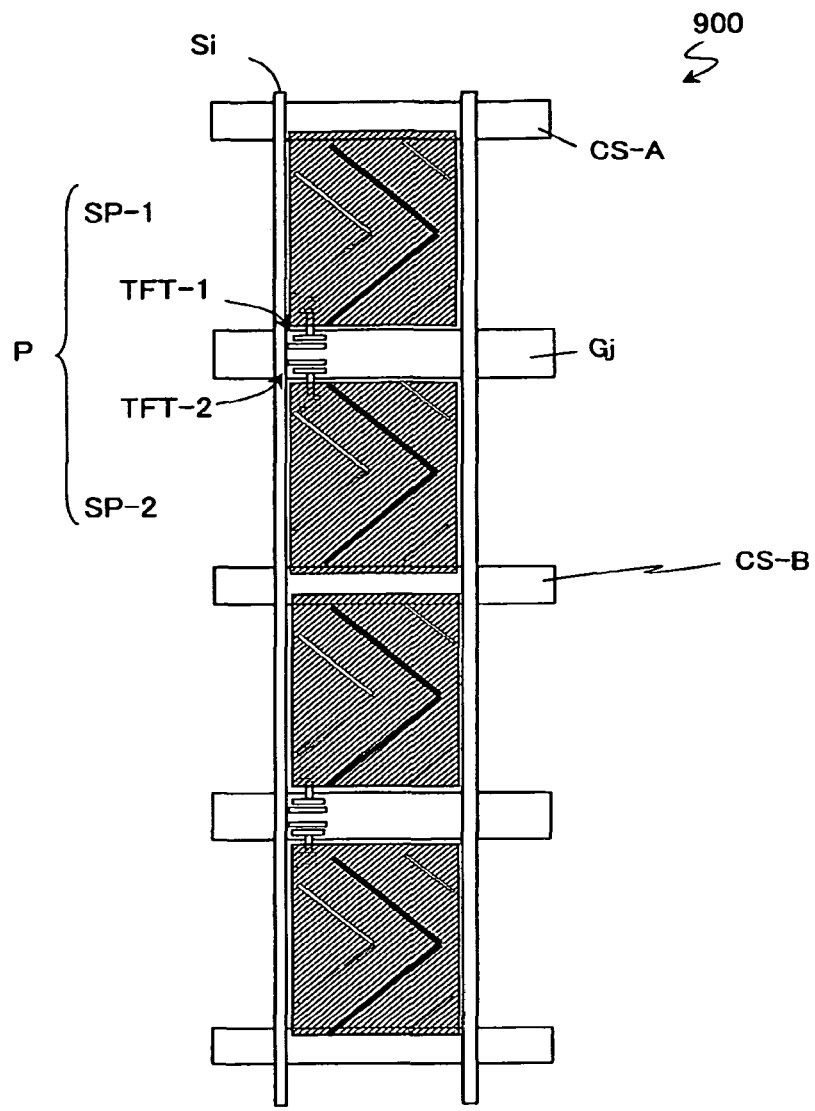
FIG. 23 A schematic diagram illustrating a multi-pixel structure of a conventional liquid crystal display device.

FIG. 1(b) shows a schematic cross-sectional view of the liquid crystal panel 110. The liquid crystal panel 110 includes an active matrix substrate 112 with a plurality of pixel electrodes 18 provided thereon, a counter substrate 114 with a counter electrode 20 provided thereon, and a liquid crystal layer 116 arranged between the active matrix substrate 112 and the counter substrate 114. Note that in the liquid crystal display device 100, polarizing plates (not shown) are arranged so as to achieve normally black. The liquid crystal panel 110 has a configuration similar to that described above with reference to FIG. 23.

Figure 2:
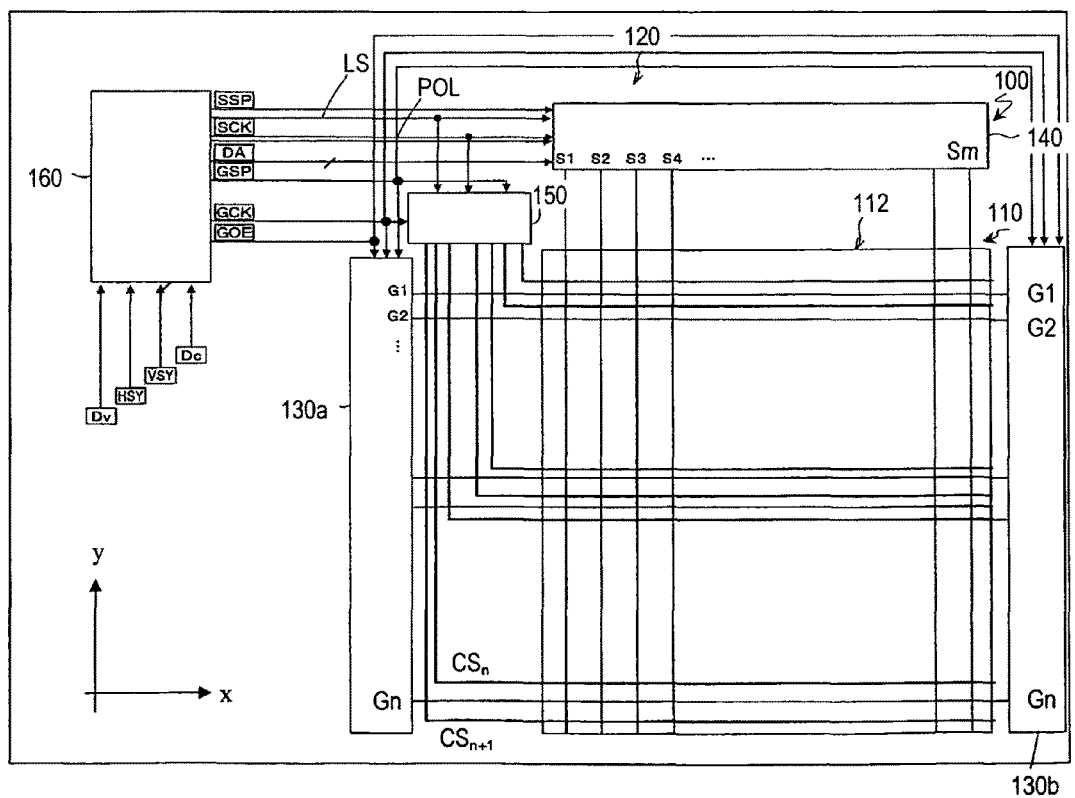
FIG. 2 A block diagram of the liquid crystal display device of Embodiment 1.

FIG. 2 shows a block diagram of the liquid crystal display device 100. Note that the counter substrate 114 and the liquid crystal layer 116 of the liquid crystal panel 110 are omitted herein so as not to overly complicate the figure. Provided on the active matrix substrate 112 of the liquid crystal panel 110 are a plurality of gate bus lines G1 to Gn extending in the x direction, source bus lines S1 to Sm extending in the y direction, and a plurality of CS bus lines (storage capacitor bus lines) CS1 to CSn+1 provided in parallel to the gate bus lines G1 to Gn. A gate bus line Gi ($1 \leq i \leq n$) is provided between CS bus lines CSi and CSi+1. The gate bus lines G1 to Gn intersect with the source bus lines S1 to Sm, and a pixel electrode (not shown in FIG. 2) is provided in the vicinity of each such intersection, so that pixel electrodes are arranged in a matrix pattern.

The driver 120 includes gate drivers (gate signal line driving circuits) 130a and 130b for supplying gate signal voltages to the gate bus lines G1 to Gn, a source driver (data signal line driving circuit) 140 for supplying source signal voltages to the source bus lines S1 to Sm, a storage capacitor signal control driver (CS control circuit) 150 for supplying CS voltages (storage capacitor signal voltages) to the CS bus lines CS1 to CSn+1, and a display control circuit 160 for controlling the gate driver 130, the source driver 140 and the CS control circuit 150. Although the gate drivers 130a and 130b are herein provided at opposite ends of the gate bus lines G1 to Gn, the two gate drivers 130a and 130b may be referred to collectively as the gate driver 130 in the description below.

Figure 3:
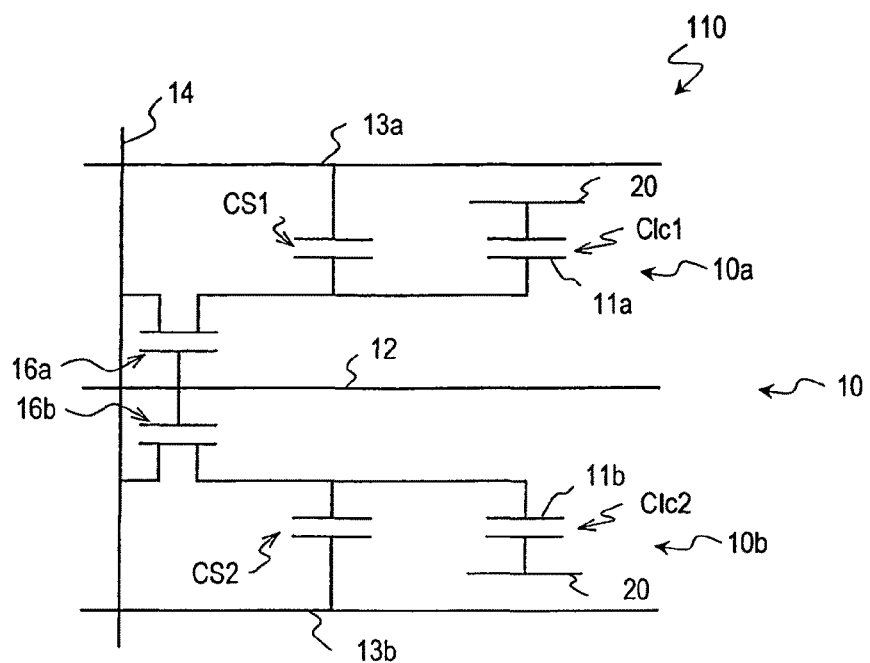
FIG. 3 An equivalent circuit diagram of a pixel in the liquid crystal display device of Embodiment 1.

FIG. 3 shows an equivalent circuit of one pixel 10 of the liquid crystal panel 110. The pixel 10 includes two sub-pixels 10a and 10b. The first sub-pixel 10a includes a liquid crystal capacitor Clc1 and a storage capacitor CS1, and the second sub-pixel 10b includes a liquid crystal capacitor Clc2 and a storage capacitor CS2. The liquid crystal capacitors Clc1 and Clc2 are capacitors formed by sub-pixel electrodes 11a and 11b, the counter electrode 20 (common to the first and second sub-pixels 10a and 10b), and a liquid crystal layer therebetween, and the capacitance values of the liquid crystal capacitors Clc1 and Clc2 are dependent on the effective voltages applied across the liquid crystal layer of the first and second sub-pixels 10a and 10b. The counter electrode 20 is provided commonly to two sub-pixels, and is typically provided commonly to all pixels in the display area. Note however that it may be divided into a plurality of regions in a large-size liquid crystal panel 110.

Thin film transistors (TFTs) 16a and 16b and the storage capacitors CS1 and CS2 are connected to the sub-pixel electrodes 11a and 11b of the first and second sub-pixels 10a and 10b, respectively. The gate electrodes of the TFT 16a and the TFT 16b are connected to a common gate bus line 12, and the source electrodes are connected to a common source bus line 14. The storage capacitors CS1 and CS2 are connected to CS bus lines 13a and 13b, respectively. The storage capacitors CS1 and CS2 are formed by storage capacitor electrodes electrically connected to the sub-pixel electrodes 11a and 11b, respectively, storage capacitor counter electrodes electrically connected to the CS bus lines 13a and 13b, and insulating layers (not shown) provided therebetween. The storage capacitor counter electrodes of the storage capacitors CS1 and CS2 are independent of each other, and CS voltages different from each other can be supplied from the CS bus lines 13a and 13b, respectively.

Reference is made again to FIG. 2. The display control circuit 160 receives, as external signals from an external signal source (e.g., a tuner), a digital video signal Dv representing an image to be displayed, a horizontal sync signal HSY and a vertical sync signal VSY corresponding to the digital video signal Dv, and a control signal Dc for controlling the display operation. Moreover, based on these external signals Dv, HSY, VSY and Dc, the display control circuit 160 produces, as signals for displaying an image represented by the digital video signal Dv on the liquid crystal panel 110, a data start pulse signal SSP, a data clock signal SCK, a latch strobe signal LS, a signal POL for controlling the polarity of the data signal voltage (source signal voltage), a digital image signal DA representing the image to be displayed, a gate start pulse signal GSP, a gate clock signal GCK, and a gate driver output control signal GOE.

More specifically, the display control circuit 160 outputs, as the digital image signal DA, the video signal Dv, which has been subjected to timing adjustment, and the like, using an internal memory as necessary, and produces the data clock signal SCK as a signal composed of pulses corresponding to pixels of the image represented by the digital image signal DA. Moreover, the display control circuit 160 produces the data start pulse signal SSP as a signal that is at a high level only for a predetermined period every horizontal scanning period based on the horizontal sync signal HSY, and produces the latch strobe signal LS based on the horizontal sync signal HSY. The display control circuit 160 further produces the gate start pulse signal GSP as a signal that is at a high level only for a predetermined period every frame period (one vertical scanning period: 1F) based on the vertical sync signal VSY, produces the gate clock signal GCK based on the horizontal sync signal HSY, and the latch strobe signal LS and the gate driver output control signal GOE based on the horizontal sync signal HSY and the control signal Dc.

The display control circuit 160 outputs the gate start pulse signal GSP, the gate clock signal GCK and the gate driver output control signal GOE, of all the signals produced as described above, to the gate driver 130. Moreover, the display control circuit 160 outputs the digital image signal DA, the latch strobe signal LS, the signal POL for controlling the polarity of the data signal voltage, the data start pulse signal SSP and the data clock signal SCK to the source driver 140. Moreover, the display control circuit 160 outputs the gate clock signal GCK and the gate start pulse signal GSP to the CS control circuit 150. Note that the display control circuit 160 may output the data clock signal SCK and the latch strobe signal LS to the CS control circuit 150 as necessary.

The gate driver 130 produces a gate signal based on the gate clock signal GCK. The gate driver 130 scans, row by row, pixels arranged in a matrix pattern by applying an image write pulse at which the gate signal voltage changes to a high level to each of the gate bus lines G1 to Gn.

Based on the digital image signal DA, the latch strobe signal LS, the signal POL for controlling the polarity of the data signal voltage, the data start pulse signal SSP and the data clock signal SCK, the source driver 140 successively produces a data signal (source signal) every horizontal scanning period (1H) as an analog voltage equivalent to the pixel value of each horizontal scan line of the image represented by the digital image signal DA, and supplies these data signals respectively to the source bus lines S1 to Sm.

Moreover, the CS control circuit 150 controls the phase or the width of the waveform of the CS voltage. Where an oscillating voltage having a waveform that oscillates with a duty cycle of 1:1 is used as the CS voltage, the CS control circuit 150 controls the phase or the width (or the period) of the oscillation.

Referring to FIG. 2 and FIG. 3, the multi-pixel driving of the liquid crystal display device 100 will be described below.

The gate driver 130 turns ON the TFTs 16a and 16b, and the source driver 140 supplies a source signal voltage to both the sub-pixel electrodes 11a and 11b via the common data signal line (source bus line) 14. Then, after the gate driver 130 turns OFF the TFTs 16a and 16b, the CS control circuit 150 changes the voltages of the CS bus lines 13a and 13b so that the voltages are different from each other. Thus, the voltages of the first liquid crystal capacitor Clc1 and the second liquid crystal capacitor Clc2 within one pixel are different from each other, thereby forming a bright sub-pixel and a dark sub-pixel within one pixel. With this configuration, the source signal voltage is supplied to two sub-pixel electrodes from one source bus line. Therefore, it is not necessary to increase the number of source bus lines or the number of the source drivers 140 for supplying the source signal to the source bus lines (see FIG. 2).

Various periods relating to the driving of a liquid crystal display device will now be defined. In the present specification, the one frame period for an input video signal for non-interlaced driving and the one field period for an input video signal for interlaced driving are referred to as "the vertical scanning period (V-Total) of the input video signal". On the other hand, in a liquid crystal display device, the period after a scan line (i.e., a gate bus line) for writing a display signal voltage (source signal voltage) is selected until the scan line is selected for writing the next display signal voltage is defined as "the vertical scanning period (V-Total)". Normally, one vertical scanning period in a liquid crystal display device corresponds to one vertical scanning period of an input video signal. For the sake of simplicity, it is assumed that one vertical scanning period=one frame period, and the following description will be directed to cases where one vertical scanning period of the liquid crystal display panel corresponds to one vertical scanning period of an input video signal. Note however that the present invention is not limited to this, but may be applicable to, for example, what is known as double speed driving (where the vertical scanning frequency is 120 Hz) in which two vertical scanning periods ($2 \times 1/120$ sec) of the liquid crystal display panel are allocated to one vertical scanning period (e.g., $1/60$ sec) of an input video signal.

Moreover, while the relationship described above holds in terms of the length of the time interval, and one vertical scanning period, when used as a time interval, is equivalent for any scan line, the vertical scanning period for the first scan line also has a meaning as a period for which one frame of image is displayed. That is, the starting point of the vertical scanning period has a meaning. Therefore, the period corresponding to one frame of image of an input video signal is referred to as a "frame", distinguished from the frame period and the vertical scanning period. Moreover, the difference (period) between a point in time when a scan line is selected and another point in time when a different scan line is next selected is referred to as one horizontal scanning period (1H).

Moreover, the vertical scanning period "V-Total" of a video signal input to the display device is composed of the effective display period (V-Disp) in which an image is displayed and the vertical blanking period (V-Blank) in which an image is not displayed. For example, where the number of rows of pixels in the display area is 1080 (accommodating full high definition), the effective display period is 1080H (horizontal scanning periods), the vertical blanking period is 45H, and the vertical scanning period (V-Total) is 1125H. Note however that while the effective display period V-Disp, for which an image is displayed, is determined by the display area (the number of effective pixel rows) of the liquid crystal panel, the vertical blanking period may not always be constant since it is a period for signal processing.

Herein, the number of horizontal scanning periods included in the vertical scanning period V-Total is denoted as Nv-Total, the number of horizontal scanning periods included in the effective display period V-Disp is denoted as Nv-Disp, and the number of horizontal scanning periods included in the vertical blanking period V-Blank is denoted as Nv-Blank. For the example described above, Nv-Total=1125, Nv-Disp=1080 and Nv-Blank=45. Note that Nv-Total is referred to also as the number of scan lines, and V-Disp is referred to also as the number of effective scan lines.

The source driver 140 of the liquid crystal display device 100 does not invert the polarity of the source signal voltage but changes the source signal voltage within the same polarity according to the video signal over a plurality of horizontal scanning periods. Since the source driver 140 does not invert the polarity of the source signal voltage over a plurality of horizontal scanning periods, as described above, the number of times the polarity of the source signal voltage is inverted is decreased, and it is therefore possible to reduce the power consumption of the source driver 140 and to suppress the heat generation.

Typically, when one increases the image writing frequency in order to improve the motion video performance, the width of the image write pulse is shortened. Therefore, when the polarity of the source signal voltage is inverted, the pixels may not be charged sufficiently due to the load capacitance and resistance of the source bus line. However, as the source driver 140 does not invert the polarity of the source signal voltage over a plurality of horizontal scanning periods, the source signal voltage changes only within the same polarity, and the pixels are charged sufficiently, even if one increases the image writing frequency. Note that herein, the liquid crystal display device 100 does not invert the polarity of the source signal voltage while pixels are successively scanned starting from the first row of pixels until the last row (the $n^{th}$ row) of pixels are scanned. In the present specification, driving so that the polarity of the source signal voltage is not inverted while scanning of pixels under predetermined conditions is proceeding from one end of a plurality of rows toward the other end is referred to as source line inversion driving. The source line inversion driving as used herein includes driving so that the polarity of the source signal voltage is not inverted over a field. Note that the liquid crystal display device 100 of the present embodiment inverts the polarity of the source signal voltage every frame.

Figure 4:
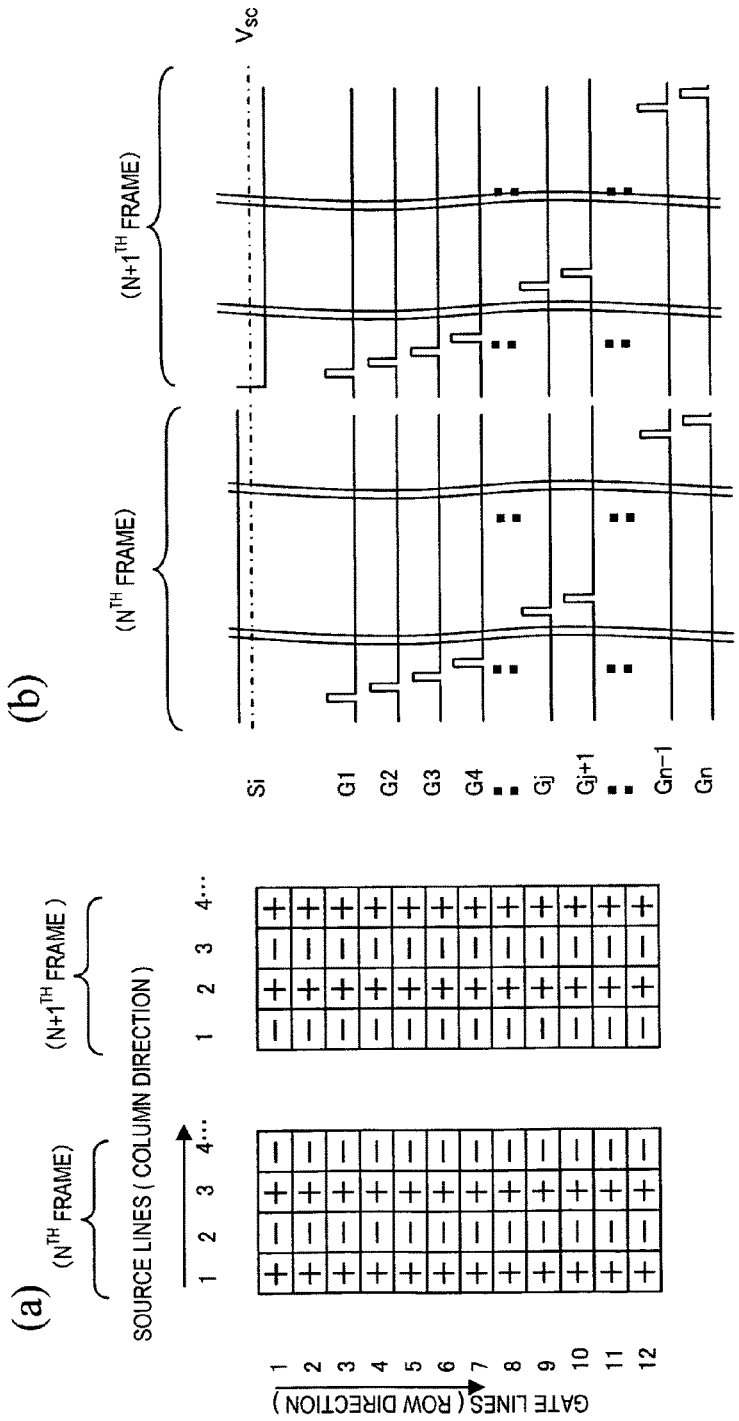
FIG. 4 (a) is a schematic diagram showing polarities of source signal voltages supplied to pixels over two consecutive frames with the liquid crystal display device of Embodiment 1, and (b) is a timing diagram showing a signal voltage supplied to the source bus line Si and signal voltages supplied to the gate bus lines G1 to Gn.
Figure 5:
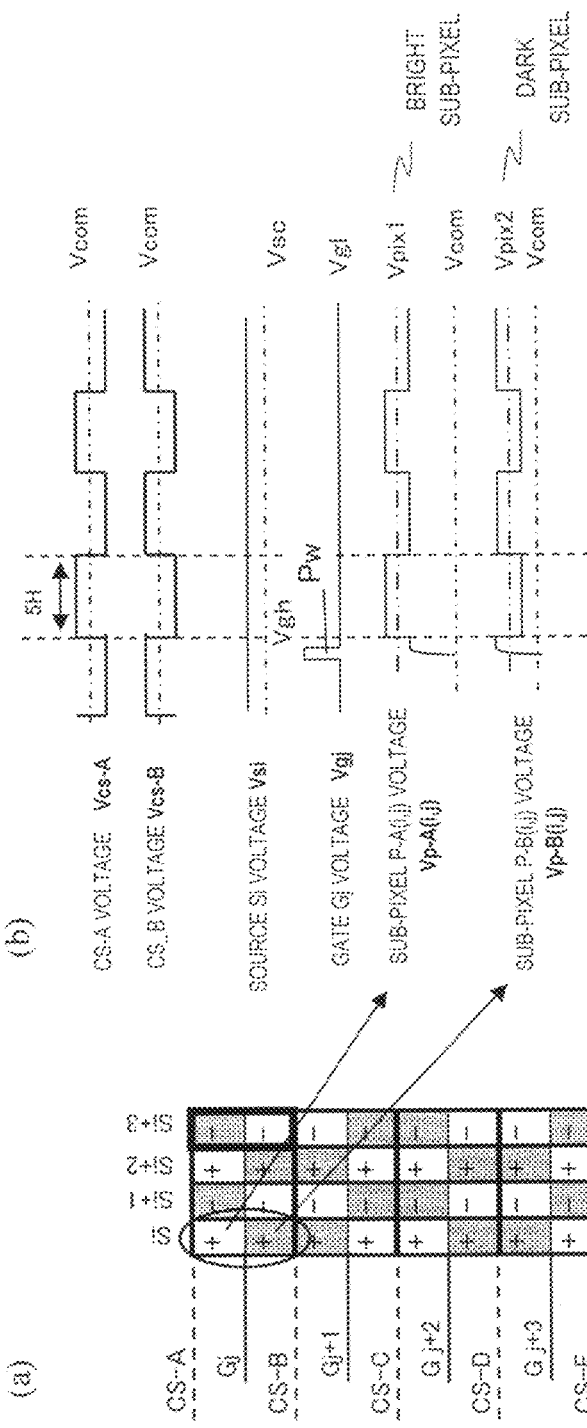
FIG. 5 (a) is a schematic diagram showing the polarity and the bright/dark status of sub-pixels of four rows and four columns of pixels in the liquid crystal display device of Embodiment 1, and (b) is a timing diagram showing CS voltages Vcs-A and Vcs-B, a source signal voltage Vsi, a gate signal voltage Vgj, and voltages Vp-A(i,j) and Vp-B(i,j) of sub-pixels P-A(i,j) and P-B(i,j).

Referring to FIG. 4 and FIG. 5, the source line inversion driving of the liquid crystal display device 100 of the present embodiment will now be described. FIG. 4(a) shows polarities of source signal voltages supplied to different pixels over two consecutive frames (the $N^{th}$ frame and the $N+1^{th}$ frame), and FIG. 4(b) shows a timing diagram showing a source signal voltage of the source bus line Si and the gate signal voltages supplied to the gate bus lines G1 to Gn over two consecutive frames.

As shown in FIG. 4(a), the polarities of the source signal voltages are not inverted during the $N^{th}$ frame (one vertical scanning period). If a source signal voltage having a positive polarity with respect to the intermediate value Vsc of the source signal voltage is applied in the $N^{th}$ frame, a source signal voltage having a negative polarity with respect to the intermediate value Vsc is applied in the next, $N+1^{th}$ frame. Typically, the intermediate value Vsc of the source signal voltage is substantially equal to the counter voltage Vcom. Moreover, within the same frame, a source signal voltage of the opposite polarity to that of the source bus line Si is applied to the source bus line Si+1 adjacent to the source bus line Si, and a source signal voltage of the opposite polarity to that of the source bus line Si+1 is similarly applied to the source bus line Si+2.

For example, in the $N^{th}$ frame, while the gate driver 130 shown in FIG. 2 successively selects the gate bus lines G1 to Gn, the source driver 140 supplies a source signal voltage having a positive polarity to the source bus line Si of the $i^{th}$ column. Then, in the next, $N+1^{th}$ frame, the polarity of the source signal voltage is inverted. In the $N+1^{th}$ frame, while the gate driver 130 shown in FIG. 2 successively selects the gate bus lines G1 to Gn, the source driver 140 supplies a source signal voltage having a negative polarity to the source bus line Si of the $i^{th}$ column. Note that in FIG. 4(b), the source signal voltage is shown to be constant over the vertical scanning period so as not to overly complicate the figure. As described above, a bright sub-pixel and a dark sub-pixel are formed within one pixel. By performing such source line inversion driving as described above, it is possible to reduce the power consumption and to suppress the charging non-uniformity.

FIG. 5 shows sub-pixels and various signal voltages in a frame when the source line inversion driving is performed. Specifically, FIG. 5(a) shows the polarity and the bright/dark status of sub-pixels of four rows and four columns of pixels. A hatched sub-pixel is a dark sub-pixel, and an unhatched sub-pixel is a bright sub-pixel. Gj to Gj+3 denote gate bus lines, CS-A to CS-E denote CS bus lines, and Si to Si+3 denote source bus lines. FIG. 5(b) shows a timing diagram showing CS voltages Vcs-A and Vcs-B, a source signal voltage Vsi, a gate signal voltage Vgj, and voltages Vp-A(i,j) and Vp-B(i,j) of sub-pixels P-A(i,j) and P-B(i,j) included in the pixel at $j^{th}$ row, $i^{th}$ column. Herein, focus is placed on the sub-pixel P-A(i,j) and the sub-pixel P-B(i,j) included in the pixel at $j^{th}$ row, $i^{th}$ column corresponding to the source bus line Si and the gate bus line Gj. Note that in the sub-pixel designation, "A" as in the sub-pixel P-A(i,j) indicates that the sub-pixel is one that is forming a storage capacitor with the CS bus line CS-A, and "B" as in the sub-pixel P-B(i,j) indicates that the sub-pixel is one that is forming a storage capacitor with the CS bus line CS-B.

The polarities of the CS voltages Vcs-A and Vcs-B with respect to the counter voltage Vcom are inverted with a constant cycle (herein, a 5H cycle). During the period of the image write pulse Pw of the gate signal, the source signal voltage Vsi is supplied to the sub-pixel P-A(i,j) and the sub-pixel P-B(i,j). The polarities of the CS voltages Vcs-A and Vcs-B are inverted after the image write pulse Pw of the gate signal falls. Specifically, the voltage of the CS bus line CS-A changes from the negative polarity to the positive polarity with respect to the counter voltage Vcom after the gate signal voltage Vgj transitions from VgH to VgL. Due to the change in the CS-A voltage, the voltage Vp-A(i,j) of the sub-pixel P-A(i,j) becomes greater than or equal to the voltage supplied during the image write pulse Pw, and the effective voltage of the sub-pixel P-A(i,j) becomes larger, thus making the sub-pixel P-A(i,j) a bright sub-pixel. Similarly, the polarity of the CS voltage Vcs-B is inverted with respect to the counter voltage Vcom with a constant cycle (herein, a 5H cycle), and the voltage of the CS bus line CS-B changes from the positive polarity to the negative polarity with respect to the counter voltage Vcom immediately after the gate signal voltage Vgj transitions from VgH to VgL. Due to the change in the CS voltage Vcs-B, the voltage Vp-B(i,j) of the sub-pixel P-B(i,j) becomes less than or equal to the voltage supplied during the image write pulse Pw, and the effective voltage of the sub-pixel P-B(i,j) becomes smaller, thus making the sub-pixel P-B(i,j) a dark sub-pixel.

The liquid crystal display device 100 of the present embodiment also performs precharge driving. Where the source line inversion driving described above is performed, the polarities of the source signal voltages are not inverted over a vertical scanning period. Therefore, by asserting the image write pulse of the gate signal supplied to the gate bus line Gj, before the source signal voltages change to values that correspond to pixels along the $j^{th}$ row so as to supply the source signal voltages, which have been supplied to pixels along the $j-1^{th}$ row, also to the pixels along the $j^{th}$ row, the pixels along the $j^{th}$ row can be charged sufficiently.

Figure 6:
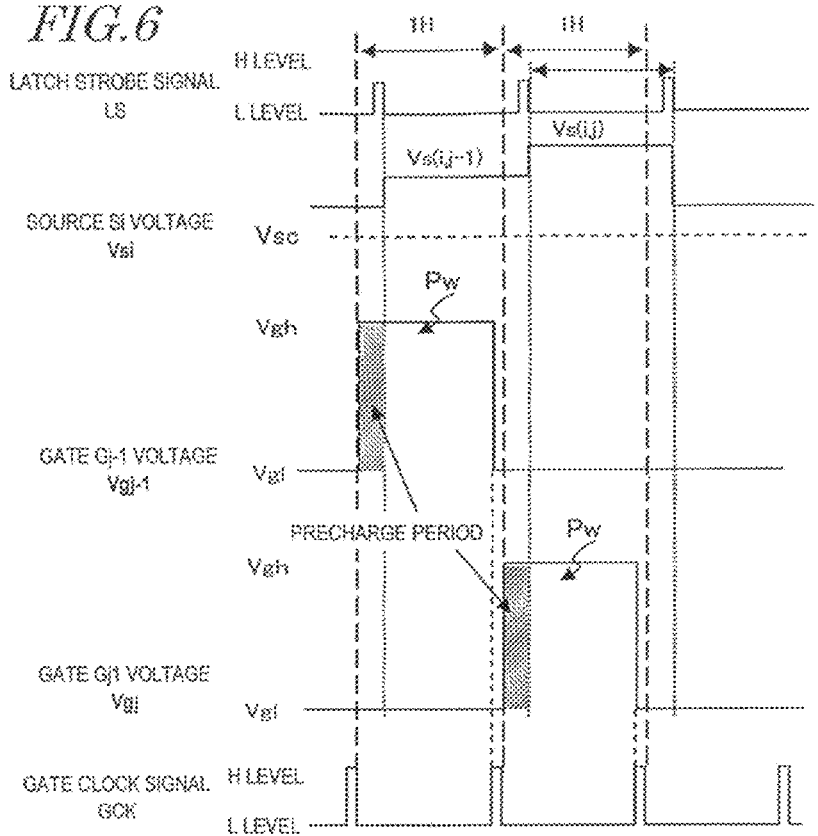
FIG. 6 A timing diagram showing a latch strobe signal LS, the source signal voltage Vsi, the gate signal voltages Vgj−1 and Vgj and a gate clock signal GCK in the liquid crystal display device of Embodiment 1.

Referring to FIG. 6, the precharge driving method will now be described. FIG. 6 shows a timing diagram showing the latch strobe signal LS, the source signal voltage Vsi supplied to the source bus line Si, the gate signal voltages Vgj-1 and Vgj supplied to the gate bus lines Gj-1 and Gj, and the gate clock signal GCK. With regard to the source signal voltage Vsi, the source signal voltages corresponding to the pixel at $j-1^{th}$ row, $i^{th}$ column and the pixel at $j^{th}$ row, $i^{th}$ column are denoted as Vs(i,j-1) and Vs(i,j).

The pulse of the gate clock signal GCK occurs every horizontal scanning period (1H), and the image write pulse Pw of the gate signal rises in synchronism with the fall of the pulse of the gate clock signal GCK and the image write pulse Pw of the gate signal falls in synchronism with the rise of the next pulse of the gate clock signal GCK. Moreover, the pulse of the latch strobe signal LS occurs every horizontal scanning period (1H), and the source signal voltage Vsi changes in synchronism with the fall of the pulse of the latch strobe signal LS.

Where the source line inversion driving described above is performed, the polarity of the source signal voltage Vs(i,j-1) is the same as the polarity of the source signal voltage Vs(i,j). Therefore, by supplying the source signal voltage Vs(i,j-1) to the pixel at $j^{th}$ row, $i^{th}$ column for performing a precharge before the source signal voltage changes from Vs(i,j-1) to Vs(i,j), the pixel at $j^{th}$ row, $i^{th}$ column can be charged sufficiently. Moreover, in order to perform such a precharge, the image write pulse Pw of the gate signal supplied to the gate bus line Gj rises before the source signal voltage changes from Vs(i,j-1) to Vs(i,j). Specifically, the pulse of the gate clock signal GCK, which is in synchronism with the rise of the image write pulse Pw of the gate signal supplied to the gate bus line Gj, falls before the fall of the pulse of the latch strobe signal LS, which is in synchronism with the change to the source signal voltage Vs(i,j).

Since the image write pulse Pw of the gate signal rises in synchronism with the fall of the pulse of the gate clock signal GCK, and falls in synchronism with the rise of the next pulse of the gate clock signal GCK, the period from the rise of the image write pulse Pw until the change of the source signal voltage (i.e., the period from the fall of the pulse of the gate clock signal GCK until the fall of the pulse of the latch strobe signal LS) serves as a precharge period. By performing a precharge as described above, it is possible to suppress pixel charging non-uniformity.

As described above, the multi-pixel technique and the precharge driving each have advantages. However, the present inventors found that simply applying precharge driving to the multi-pixel technique results in problems as follows.

Figure 7:
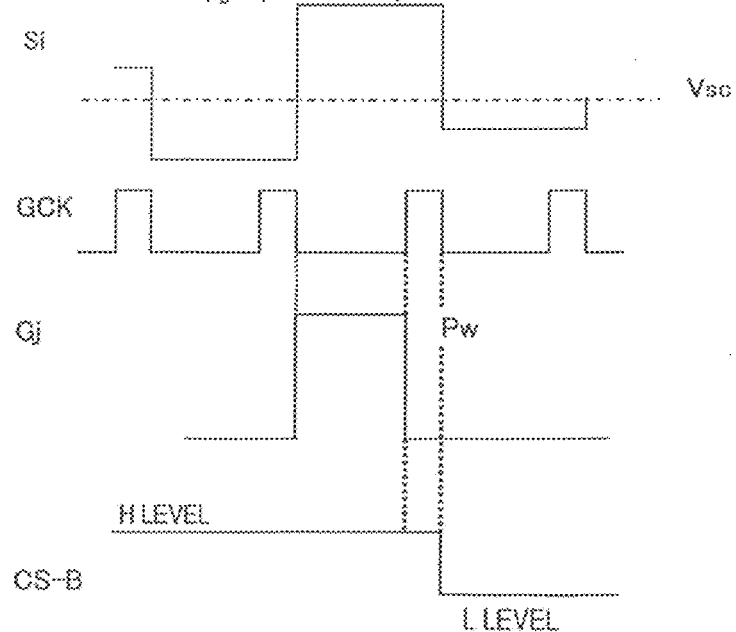
FIG. 7 A timing diagram showing the source signal voltage supplied to the source bus line Si, the gate signal voltage supplied to the gate bus line Gj, the gate clock signal GCK and the CS voltage in a liquid crystal display device of Comparative Example 1.
Figure 25:
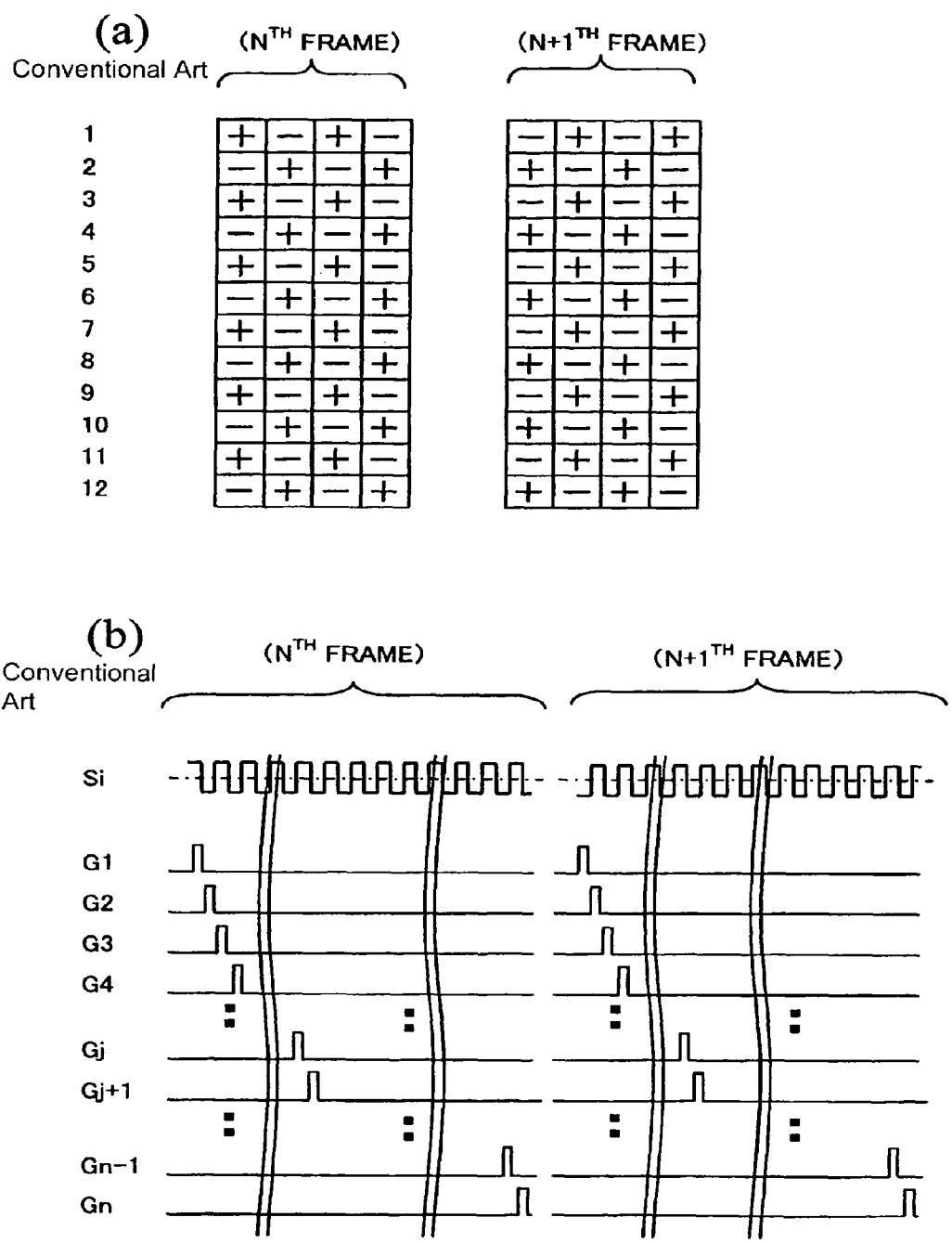
FIG. 25 (a) is a schematic diagram showing the polarities of the source signal voltages supplied to pixels over two consecutive frames (the $N^{th}$ frame and the $N+1^{th}$ frame) with the conventional liquid crystal display device, and (b) is a timing diagram showing the source signal voltage supplied to the source bus line Si and the gate signal voltages supplied to the gate bus lines G1 to Gn over two consecutive frames.

Advantages of the liquid crystal display device 100 of the present embodiment, in comparison with liquid crystal display devices of Comparative Examples 1 and 2, will now be described. First, referring to FIG. 7, a liquid crystal display device of Comparative Example 1 will be described. The liquid crystal display device of Comparative Example 1 performs the dot inversion driving described above with reference to FIG. 24 and FIG. 25. FIG. 7 shows a timing diagram showing the source signal voltage supplied to the source bus line Si, the gate clock signal GCK, the gate signal voltage supplied to the gate bus line Gj and the CS voltage in the liquid crystal display device of Comparative Example 1.

The image write pulse Pw of the gate signal supplied to the gate bus line Gj rises in synchronism with the fall of the pulse of the gate clock signal and falls in synchronism with the rise of the next pulse of the gate clock signal. Note that the period over which the source signal voltage supplied to the source bus line Si is Vs(i,j) is the period from the fall of the pulse of the gate clock signal until the fall of the next pulse, and the source signal voltage supplied to the source bus line Si is Vs(i,j) during the period of the image write pulse Pw of the gate bus line Gj. Then, when the pulse of the gate clock signal, which rose in synchronism with the fall of the image write pulse of the gate signal, falls, the polarity of the CS voltage connected to the pixel at $j^{th}$ row, $i^{th}$ column is inverted in synchronism with the fall of the pulse of the gate clock signal. Note that although not shown here, the image write pulse Pw of the gate signal supplied to the gate bus line Gj+1 rises in synchronism with this fall of the pulse of the gate clock signal. With the dot inversion driving, since the polarity of the source signal voltages Vs(i,j−1) and Vs(i,j+1) is inverted from the polarity of the source signal voltage Vs(i,j), the width of the image write pulse Pw of the gate bus line Gj is set sufficiently shorter than the pulse of the source signal voltage Vs(i,j), thus elongating the period from the fall of the image write pulse Pw of the gate bus line Gj until the rise of the image write pulse Pw of the gate bus line Gj+1 (not shown), so that data can be written normally even if the waveform of the image write pulse Pw of the gate signal is blunted due to the load capacitance and resistance of the gate bus line. Note that the width of the image write pulse Pw of the gate bus line Gj is set by adjusting the pulse width of the gate clock signal GCK. As described above, since the width of the image write pulse Pw of the gate bus line Gj is sufficiently shorter than the pulse of the source signal voltage Vs(i,j), the timing of the CS signal whose voltage changes in synchronism with the fall of the pulse of the gate clock signal is not substantially influenced by the waveform blunting of the image write pulse Pw. The liquid crystal display device of Comparative Example 1 performs high-quality display using the multi-pixel technique described above by performing such dot inversion driving as described above.

Figure 8:
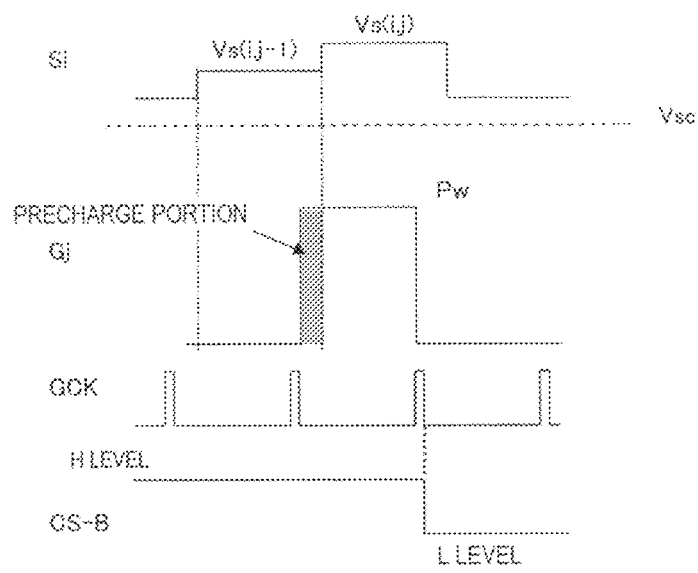
FIG. 8 A timing diagram showing the source signal voltage supplied to the source bus line Si, the gate signal voltage supplied to the gate bus line Gj, the gate clock signal GCK and the CS voltage in a liquid crystal display device of Comparative Example 2.

Next, referring to FIG. 8, a liquid crystal display device of Comparative Example 2 will be described. The liquid crystal display device of Comparative Example 2 is obtained by simply applying source line inversion driving and precharge driving to the multi-pixel technique. FIG. 8 shows a timing diagram showing the source signal voltage supplied to the source bus line Si, the gate signal voltage supplied to the gate bus line Gj, the gate clock signal GCK and the CS voltage in the liquid crystal display device of Comparative Example 2.

The image write pulse Pw of the gate signal supplied to the gate bus line Gj rises in synchronism with the fall of the pulse of the gate clock signal. After the image write pulse Pw of the gate signal rises, the source signal voltage changes from Vs(i,j−1) to Vs(i,j) within the same polarity. Then, the image write pulse Pw of the gate signal falls in synchronism with the rise of the next pulse of the gate clock signal. Next, in synchronism with the fall of this pulse of the gate clock signal, the polarity of the CS voltage connected to the pixel at $j^{th}$ row, $i^{th}$ column is changed, and the image write pulse Pw of the gate signal supplied to the gate bus line Gj+1 rises though not shown here.

In the liquid crystal display device of Comparative Example 2, the polarity of the source signal voltage is not inverted over a vertical scanning period, and it is therefore possible to suppress the heat generation of the source driver. Moreover, since the polarity of the source signal voltage is not inverted over a vertical scanning period, the image write pulse of the gate signal is asserted for performing a precharge before the source signal voltage changes within the same polarity, and thus pixels can be charged sufficiently.

Note that in the liquid crystal display device of Comparative Example 1, which does not perform a precharge, the image write pulse Pw of the gate signal is asserted at the same timing as the change of the source signal voltage from Vs(i,j−1) to Vs(i,j), whereas in the liquid crystal display device of Comparative Example 2, which performs a precharge, the width of the pulse of the gate clock signal GCK is shortened, and the image write pulse of the gate signal is asserted in synchronism with the fall of the pulse of the gate clock signal before the source signal voltage changes from Vs(i,j−1) to Vs(i,j). Therefore, with the liquid crystal display device of Comparative Example 2, as compared with a case where a precharge is not performed, the width of the pulse of the gate clock signal GCK is shortened. As described above, if the width of the pulse of the gate clock signal GCK is short, the bright/dark may differ between sub-pixels depending on the distance from the gate driver even if similar signals are supplied thereto.

Figure 9:
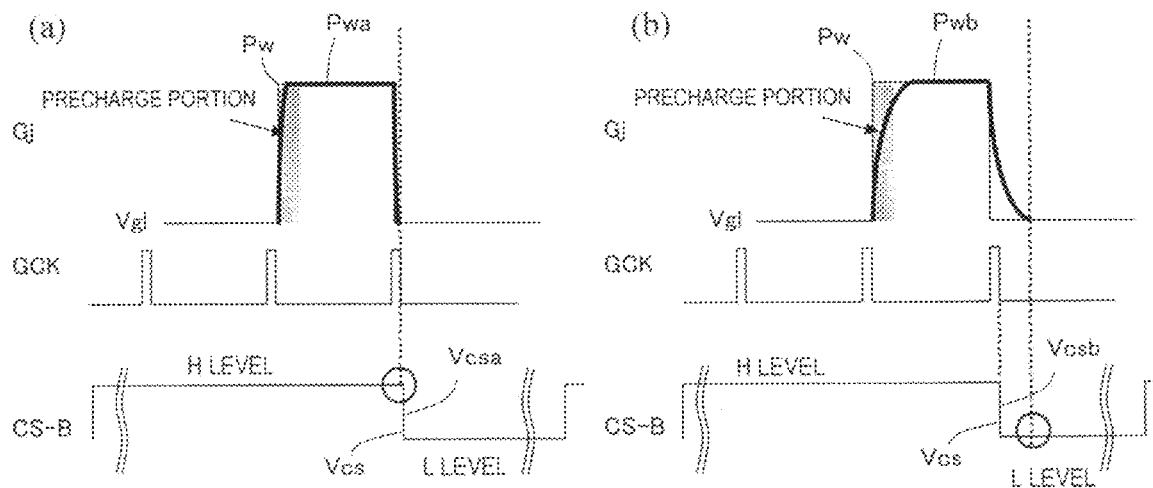
FIG. 9 (a) is a schematic diagram showing a timing diagram showing a gate signal voltage supplied to a gate bus line Gj with respect to a sub-pixel which is near from a gate driver, the gate clock signal GCK and the CS voltage in the liquid crystal display device of Comparative Example 2, and (b) is a timing diagram showing a gate signal voltage supplied to the gate bus line Gj with respect to a sub-pixel which is distant from the gate driver, the gate clock signal GCK and the CS voltage in the liquid crystal display device of Comparative Example 2.

Referring to FIG. 9, the reason why the bright/dark status differs between sub-pixels depending on the distance from the gate driver will now be described. Note that the pulse Pw of the gate signal produced in the gate driver for supplying the pulse to the gate bus line is herein referred to also as an "image write pulse", distinguished from the pulse actually applied to the gate electrode of a TFT corresponding to a sub-pixel.

FIG. 9(a) shows the image write pulse Pw of the gate signal, a pulse Pwa applied to the gate electrode of a TFT corresponding to a sub-pixel which is near from the gate driver, the gate clock signal GCK, and the CS voltage Vcs of the CS signal produced in the CS control circuit. Moreover, FIG. 9(b) shows the image write pulse Pw of the gate signal produced in the gate driver, a pulse Pwb applied to the gate electrode of a TFT corresponding to a sub-pixel which is distant from the gate driver, the gate clock signal GCK, and the CS voltage Vcs produced in the CS control circuit. A signal similar to that for the sub-pixel P-B(i,j) shown in FIG. 5(b), i.e., a signal that ideally makes the sub-pixel a dark sub-pixel, is supplied to both of sub-pixels of FIG. 9(a) and FIG. 9(b).

As shown in FIG. 9(a), the pulse Pwa is slightly blunted with respect to the image write pulse Pw due to the load capacitance and resistance of the gate bus line. Note however that since the sub-pixel is near the gate driver, the degree of blunting is relatively small, so that the voltage of the gate electrode transitions to Vgl while the CS voltage Vcs-B is at the high level, and then the CS voltage Vcs-B changes from the high level to the low level. Therefore, a sub-pixel which is supposed to be a dark sub-pixel successfully becomes a dark sub-pixel.

In contrast, where the sub-pixel is far away from the gate driver, as shown in FIG. 9(b), the pulse Pwb is blunted relatively substantially with respect to the image write pulse Pw due to the load capacitance and resistance of the gate bus line. Particularly, as the size and the definition of the liquid crystal panel 110 are increased, the load capacitance and resistance of the gate bus line increase, and the blunting becomes significant. With such substantial blunting, the voltage of the gate electrode of the TFT corresponding to this sub-pixel does not transition to Vgl while the CS voltage Vcs-B is at the high level, but the voltage transitions to Vgl after the CS voltage Vcs-B changes to the low level, and then (e.g., after 5H), the CS voltage Vcs-B is inverted from the low level to the high level. Where the source signal voltage is positive, if the voltage of the gate electrode transitions to the low level after the voltage of the CS voltage changes from the high level to the low level, since the first change of the oscillating voltage of the CS bus line CS-B after the voltage of the gate electrode transitions to the low level is an increase, the voltage of the sub-pixel receives an up-thrusting effect instead of a down-thrusting effect. Therefore, a sub-pixel which is supposed to be a dark sub-pixel becomes a bright sub-pixel, thereby resulting in the occurrence of bright/dark inversions, thus lowering the display quality.

Note that if the width of the pulse of the gate clock signal is long, there is a long period from the fall of the image write pulse of the gate signal supplied to the gate bus line Gj in synchronism with the rise of the pulse of the gate clock signal until the inversion of the polarity of the CS voltage in synchronism with the fall of the pulse of the gate clock signal. Therefore, the bright/dark inversion of a sub-pixel is unlikely to occur even if the pulse applied to the gate electrode of the TFT corresponding to the sub-pixel is somewhat blunted with respect to the image write pulse. However, with the liquid crystal display device of Comparative Example 2, which performs precharge driving, the width of the pulse of the gate clock signal is shortened, and when the polarity of the CS voltage Vcs is inverted in synchronism with the fall of the gate clock signal GCK, the polarity of the CS voltage is likely to be inverted before the pulse applied to the gate electrode of the TFT corresponding to the sub-pixel falls.

The liquid crystal display device 100 of the present embodiment will now be described. The liquid crystal display device 100 differs from the liquid crystal display device of Comparative Example 1 in that the liquid crystal display device 100 performs source line inversion driving and precharge driving. Moreover, although the liquid crystal display device 100 applies source line inversion driving and precharge driving to the multi-pixel technique as with the liquid crystal display device of Comparative Example 2, the liquid crystal display device 100 differs from the liquid crystal display device of Comparative Example 2 in that the polarity of the CS voltage is inverted after the image write pulse Pw of the gate signal rises, instead of in synchronism with the rise of the image write pulse Pw of the gate signal (i.e., the fall of the pulse of the gate clock signal).

Figure 10:
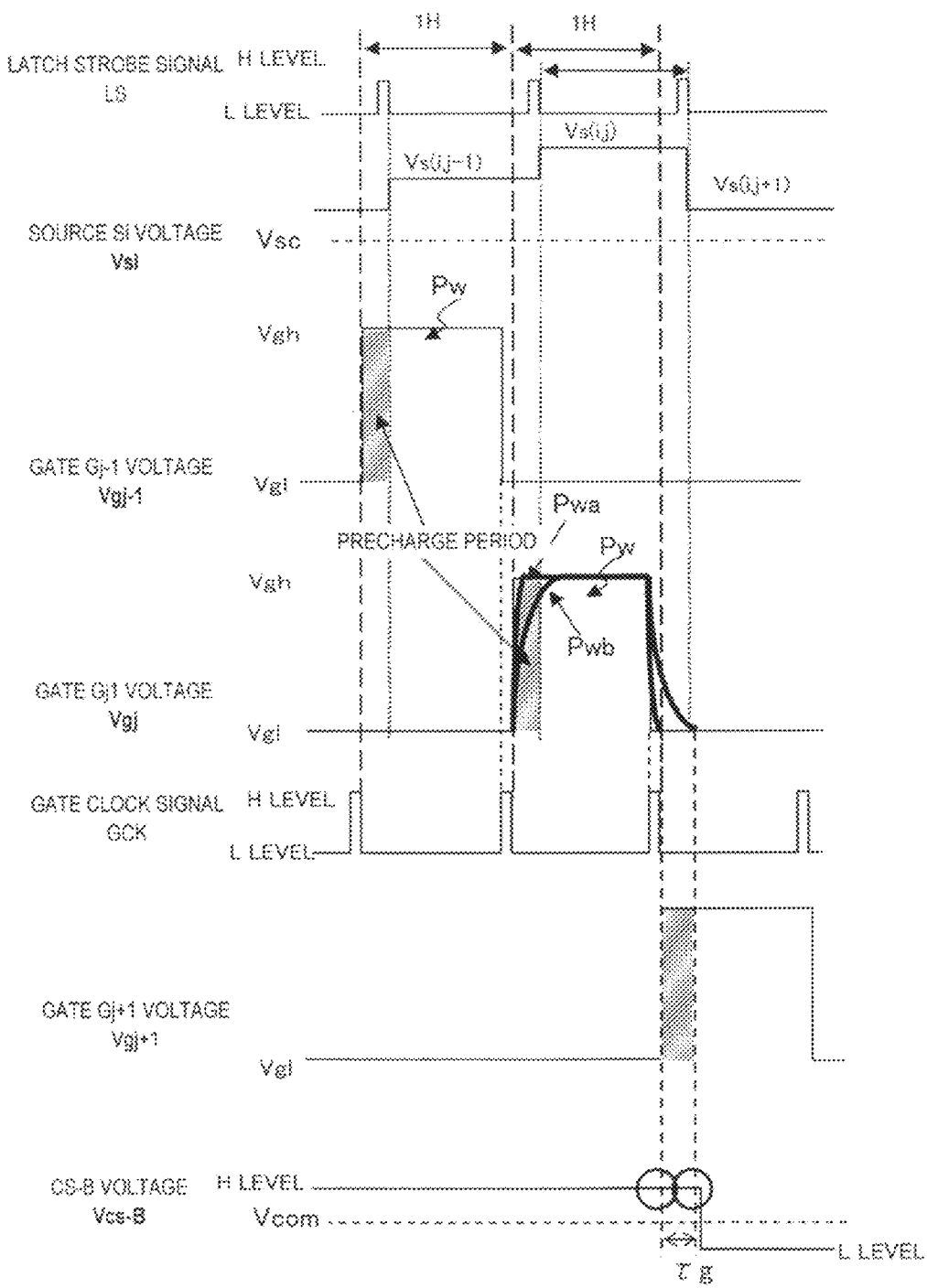
FIG. 10 A timing diagram showing the latch strobe signal LS, the source signal voltage Vsi, the gate signal voltages Vgj−1, Vgj and Vgj+1, the gate clock signal GCK and the CS voltage Vcs-B in the liquid crystal display device of Embodiment 1.

FIG. 10 shows a timing diagram showing the latch strobe signal LS, the source signal voltage Vsi supplied to the source bus line Si, the gate signal voltages Vgj-1, Vgj and Vgj+1 supplied to the gate bus lines Gj-1, Gj and Gj+1, the gate clock signal GCK and the CS voltage Vcs-B in the liquid crystal display device 100 of the present embodiment.

The driver 120 (see FIG. 1(a)) of the liquid crystal display device 100 inverts the polarity of the CS voltage after the passage of a predetermined amount of time since the rise of the image write pulse of the gate signal, instead of in synchronism with the rise of the image write pulse of the gate signal. Specifically, the CS control circuit 150 (see FIG. 2) inverts the polarity of the CS voltage after the passage of a predetermined amount of time since the rise of the image write pulse of the gate signal.

As compared with the liquid crystal display devices of Comparative Examples 1 and 2, the liquid crystal display device 100 inverts the polarity of the CS voltage after a delay by an amount of time τg from the fall of the pulse of the gate clock signal until the fall of the pulse applied to the gate electrode of the TFT corresponding to the sub-pixel. Therefore, even if the pulse applied to the gate electrode of the TFT corresponding to the sub-pixel is blunted with respect to the image write pulse of the gate signal, the timing at which the gate of the sub-pixel is actually turned OFF will not be deviated with respect to the timing at which the polarity of the CS voltage is inverted, and it is therefore possible to suppress the occurrence of bright/dark inversions.

The scanning of the pixel at $j-1^{th}$ row, $i^{th}$ column and the pixel at $j^{th}$ row, $i^{th}$ column will now be described. Herein, the source signal voltage for $j-1^{th}$ row, $i^{th}$ column, the source signal voltage for $j^{th}$ row, $i^{th}$ column and the source signal voltage for $j+1^{th}$ row, $i^{th}$ column are Vs(i,j-1), Vs(i,j) and Vs(i,j+1), and the pulses of the gate clock signal therefor are referred to sequentially as the first pulse, the second pulse and the third pulse.

First, the first pulse of the gate clock signal GCK falls. The image write pulse of the gate signal supplied to the gate bus line Gj-1 of the $j-1^{th}$ row rises in synchronism with the fall of the first pulse of the gate clock signal GCK. After the first pulse of the gate clock signal GCK falls, the source signal voltage changes to Vs(i,j-1).

Next, the second pulse of the gate clock signal GCK rises. The image write pulse of the gate signal supplied to the gate bus line Gj-1 of the $j-1^{th}$ row falls in synchronism with the rise of the second pulse of the gate clock signal GCK. Thus, sub-pixels included in the pixel at $j-1^{th}$ row, $i^{th}$ column are disconnected from the source bus line Si.

Next, the second pulse of the gate clock signal GCK falls. The image write pulse of the gate signal supplied to the gate bus line Gj of the $j^{th}$ row rises in synchronism with the fall of the second pulse of the gate clock signal GCK. Thus, the source signal voltage Vs(i,j-1) is supplied to sub-pixels at $j^{th}$ row, $i^{th}$ column. Note that as described above, the pixel at $j^{th}$ row, $i^{th}$ column is precharged by asserting the image write pulse of the gate signal for pixels along the row to supply the source signal voltage Vs(i,j-1) to the pixel at $j^{th}$ row, $i^{th}$ column before the source signal voltage is changed to Vs(i,j).

Then, after the second pulse of the gate clock signal GCK falls, the source signal voltage is changed from Vs(i,j-1) to Vs(i,j). Thus, the source signal voltage Vs(i,j) is supplied to the pixel at $j^{th}$ row, $i^{th}$ column.

Next, the third pulse of the gate clock signal GCK rises. The image write pulse of the gate signal supplied to the gate bus line Gj of the $j^{th}$ row falls in synchronism with the rise of the third pulse of the gate clock signal GCK. Thus, sub-pixels included in pixels along the $j^{th}$ row are disconnected from the source bus line Si.

Next, the third pulse of the gate clock signal GCK falls. The image write pulse of the gate signal supplied to the gate bus line Gj+1 of the $j+1^{th}$ row rises in synchronism with the fall of the third pulse of the gate clock signal GCK. Thus, the source signal voltage Vs(i,j) is supplied to sub-pixels at $j+1^{th}$ row, $i^{th}$ column. Note that as described above, the pixel at $j+1^{th}$ row, $i^{th}$ column is precharged by asserting the image write pulse of the gate signal for pixels along the $j+1^{th}$ row to supply the source signal voltage Vs(i,j) to pixels along the $j+1^{th}$ row before the source signal voltage is changed to Vs(i,j+1).

The CS voltage Vcs-B is inverted from the high level to the low level after the passage of a predetermined period since the fall of the third pulse of the gate clock signal GCK. Thus, voltages of second sub-pixels of pixels along the $j-1^{th}$ row and those of first sub-pixels of pixels along the $j^{th}$ row drop. Since the source signal voltage of the positive polarity has been supplied to the second sub-pixel at $j-1^{th}$ row, $i^{th}$ column and the first sub-pixel at $j^{th}$ row, $i^{th}$ column, these sub-pixels become dark sub-pixels. Moreover, although not shown here, the CS voltage Vcs-A is inverted from the low level to the high level at the same time as the inversion of the polarity of the CS voltage Vcs-B. Thus, the voltage of the first sub-pixel at $j-1^{th}$ row, $i^{th}$ column increases, and the sub-pixel becomes a bright sub-pixel. Thereafter, the various signal voltages change similarly for pixels along the j+1$^{th}$ row.

In this way, with the liquid crystal display device 100, the polarity of the CS voltage is not in synchronism with the rise of the image write pulse of the gate signal, but is inverted after the passage of a predetermined amount of time since the rise of the image write pulse of the gate signal. The predetermined amount of time is determined based on the time constant τg=CR of the gate bus line, for example. For example, the amount of time corresponding to the voltage at which a TFT is turned OFF may be calculated by simulation. For example, in the case of a 37-inch FHD (full high definition; 1080× 1920×RGB dots) liquid crystal display device, the amount of time is 2 μs, and this amount of time increases as the size of the liquid crystal panel 110 (FIG. 1(a)) increases because the load of the gate bus line increases.

Note that for any sub-pixel, it is preferred that the CS voltage is substantially at a desired level (the high level or the low level) when the pulse applied to the gate electrode of the corresponding TFT falls. Being substantially at a desired level means being at a level of 97% or more, more preferably 99% or more, of the peak-to-peak. If the gate of a sub-pixel is turned OFF when the CS voltage has not reached a desired level, the up-thrusting effect or the down-thrusting effect on the voltage of the sub-pixel, or the degree thereof, varies, thereby varying the bright/dark and the degree thereof, due to the change in the CS voltage.

As described above, the liquid crystal display device 100 inverts the polarity of the CS voltage taking into consideration the delay time of the pulses Pwa and Pwb with respect to the image write pulse Pw of the gate signal produced in the gate driver 130 (see FIG. 2). For example, it is possible to achieve a desired bright sub-pixel and dark sub-pixel by maintaining the CS voltage at the high level until the pulse applied to the gate electrode of the TFT corresponding to the sub-pixel falls and bringing the CS voltage to the low level after the pulse applied to the gate electrode of the TFT corresponding to the sub-pixel falls. Alternatively, it is possible to achieve a desired bright sub-pixel or dark sub-pixel by maintaining the CS voltage at the low level until the pulse applied to the gate electrode of the TFT corresponding to the sub-pixel falls and bringing the CS voltage to the high level after the pulse applied to the gate electrode of the TFT corresponding to the sub-pixel falls.

Figure 11:
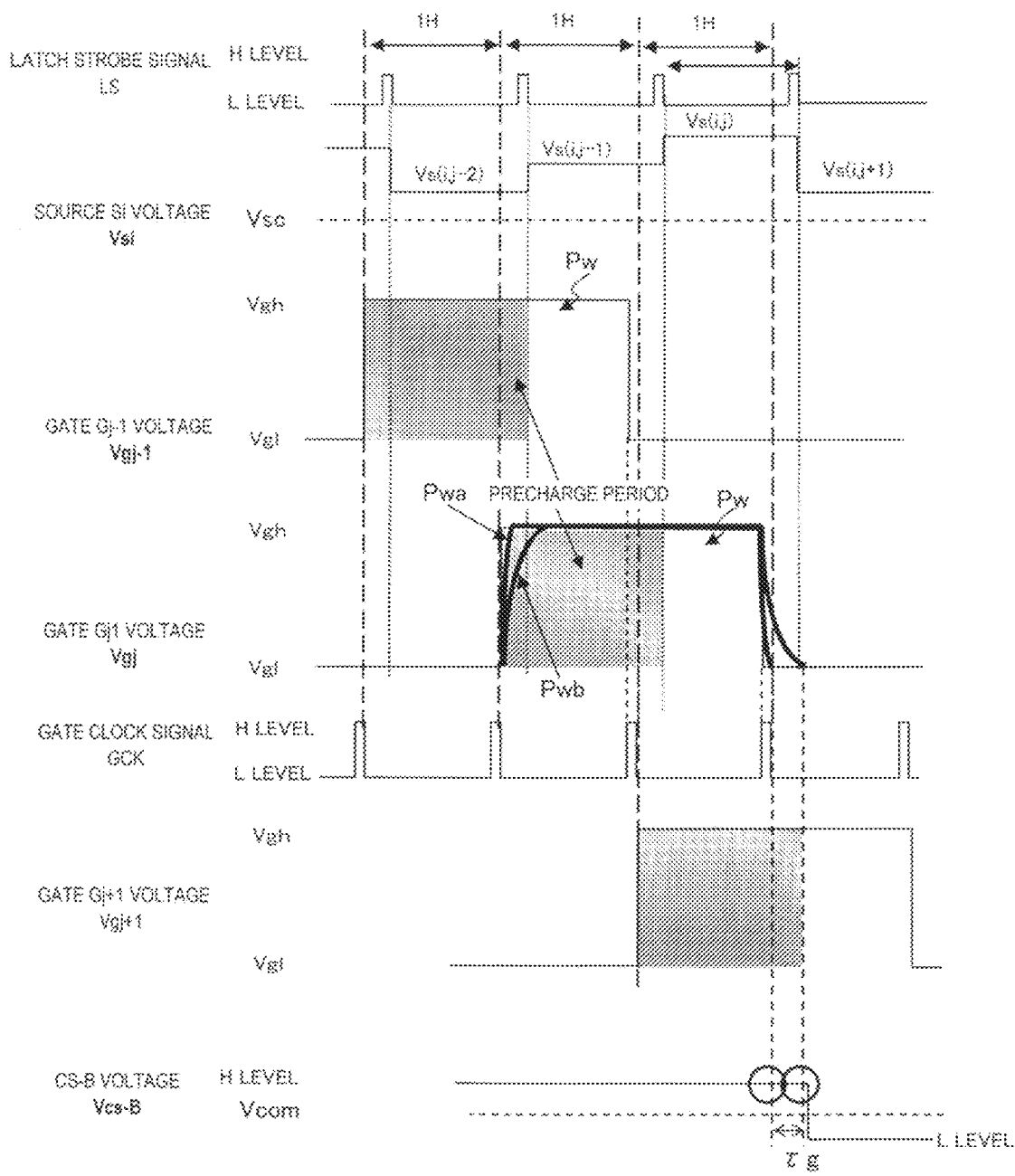
FIG. 11 A timing diagram showing the latch strobe signal LS, the source signal voltage Vsi, the gate signal voltages Vgj−1, Vgj and Vgj+1, the gate clock signal GCK and the CS voltage Vcs-B in a variation of the liquid crystal display device of Embodiment 1.

Note that while the image write pulse of the gate signal supplied to the gate bus line Gj+1 does not overlap with the image write pulse of the gate signal supplied to the gate bus line Gj in the description above, the present invention is not limited to this. As shown in FIG. 11, the image write pulse of the gate signal supplied to the gate bus line Gj+1 may overlap with the image write pulse of the gate signal supplied to the gate bus line Gj.

Moreover, even if precharge driving is performed, the period from the fall of the image write pulse of the gate signal until the timing at which the change of the source signal voltage is started is set to be greater than or equal to the gate delay time (τg) due to the load within the panel. Therefore, the polarity of the CS voltage may be inverted in synchronism with, or subsequent to, the timing at which the change of the source signal voltage is started. Also in this case, the polarity of the CS voltage can be inverted after the gate of the sub-pixel is actually turned OFF, and it is therefore possible to suppress bright/dark inversions.

Embodiment 2

While the gate driver 130 (see FIG. 2) performs progressive scanning in the description above, the present invention is not limited to this. The gate driver 130 may perform interlaced scanning.

Referring to FIG. 12 and FIG. 13, a second embodiment of the liquid crystal display device according to the present invention will now be described. Note that the liquid crystal display device 100 of the present embodiment has a similar configuration to that of the liquid crystal display device of Embodiment 1 described above with reference to FIG. 1 to FIG. 3, except that the gate driver 130 (see FIG. 2) performs interlaced scanning. Therefore, description that is redundant with Embodiment 1 will be omitted below in order to avoid redundancy.

The liquid crystal display device 100 of the present embodiment applies source line inversion driving to the multi-pixel technique, and performs gate bus line interlaced scanning driving (interlaced driving). Thus, the liquid crystal display device 100 reduces the power consumption of the source driver 140 (see FIG. 2), and can suppress the decrease in the charging rate even if the image writing frequency is improved in order to improve the motion video performance.

FIG. 12(a) shows the order in which pixels are scanned over two consecutive frames (the N$^{th}$ frame and the N+1$^{th}$ frame) and the polarities of the source signal voltages corresponding to the pixels. FIG. 12(b) shows a timing diagram showing the source signal voltage supplied to the source bus line Si and the gate signal voltages supplied to the gate bus lines G1 to Gn over two consecutive frames. Herein, each frame is divided into two periods (the first ½ frame and the latter ½ frame). In the present specification, the two periods included in a frame are referred to as sub-frames, and since one frame period typically corresponds to one vertical scanning period, the period corresponding to a sub-frame period is referred to as a sub-vertical scanning period. Note that the sub-frame in which pixels along odd-numbered rows are scanned is herein referred to as the first sub-frame, and the sub-frame in which pixels along even-numbered rows are scanned is herein referred to as the second sub-frame. Note that the length of the first sub-frame may not completely coincide with that of the second sub-frame. If odd-numbered rows are 1 to n and even-numbered rows are 2 to n−1, the number of even-numbered rows is smaller by one than the number of odd-numbered rows, and accordingly the second sub-frame is shorter than the first sub-frame.

In the first ½ frame (the first sub-vertical scanning period) of the N$^{th}$ frame, the image write pulse Pw, which brings the gate signal voltage Vg from VgL (the low level) to VgH (the high level) for a predetermined period, is applied successively to gate bus lines of odd-numbered rows, for example. That is, in the first ½ frame, the source signal voltage is supplied to pixels of all the odd-numbered rows, i.e., the first row, the third row, . . . . In the latter ½ frame (the second sub-vertical scanning period) of the N$^{th}$ frame, the image write pulse Pw, which brings Vg from VgL to VgH for a predetermined period, is applied successively to gate bus lines of even-numbered rows. That is, in the latter ½ frame, the source signal voltage is supplied to pixels of all the even-numbered rows, i.e., the second row, the fourth row, . . . .

Therefore, a source signal voltage having a positive polarity with respect to the intermediate value Vsc of the source signal voltage is supplied to the source bus line Si in the first ½ frame of the N$^{th}$ frame, and a source signal voltage having the positive polarity is supplied thereto also in the following, latter ½ frame. Note that in the same sub-vertical scanning period, the polarity of the source signal voltage supplied to the source bus line Si+1 adjacent to the source bus line Si is opposite to the polarity of the source signal voltage supplied to the source bus line Si. Similarly, the polarity of the source signal voltage supplied to the source bus line Si+2 is opposite to the polarity of the source signal voltage supplied to the source bus line Si+1.

The liquid crystal display device 100 inverts the polarity of the source signal voltage every frame. In the first ½ frame of the N+1$^{th}$ frame, a source signal voltage having a negative polarity with respect to the intermediate value Vsc is supplied to the source bus line Si. Then, a source signal voltage having the negative polarity is supplied to the source bus line Si also in the latter ½ frame of the N+1$^{th}$ frame.

FIG. 13(a) shows the polarity and the bright/dark status of sub-pixels of four rows and four columns of pixels. As shown in FIG. 13(a), although the liquid crystal display device 100 of the present embodiment performs source line inversion driving, the bright/dark statuses of sub-pixels are similar to those of the conventional dot inversion driving shown in FIG. 24(a), where bright sub-pixels and dark sub-pixels are each arranged in a checkered pattern. Therefore, since bright sub-pixels are not unevenly distributed, it is possible to suppress the display non-uniformity.

FIG. 13(b) shows a timing diagram showing the CS voltage Vcs-B, the source signal voltage Vsi supplied to the source bus line Si, the gate signal voltage Vgj supplied to the gate bus line Gj, the voltage Vp-B(i,j) of the sub-pixel P-B(i,j), the gate signal voltage Vgj+1 supplied to the gate bus line Gj+1, and the voltage Vp-B(i,j+1) of the sub-pixel P-B(i,j+1) in the liquid crystal display device 100.

The CS voltage Vcs-B supplied to the CS bus line CS-B has an oscillating waveform whose polarity is inverted with respect to the counter voltage Vcom with a constant cycle. The oscillating waveform is, for example, a rectangular wave having a duty cycle of 1:1 as shown in the figure.

Since the source signal voltage of the positive polarity is supplied to the source bus line Si when the gate signal voltage of the gate bus line Gj is at the high level, the voltage of the pixel P-B(i,j) is positive. The CS voltage Vcs-B supplied to the CS bus line CS-B has an oscillating waveform whose polarity is inverted with respect to the counter voltage Vcom with a constant cycle (for example, a rectangular wave having a duty cycle of 1:1 as shown in the figure), and the first change of the oscillating voltage Vcs-B of the CS bus line CS-B after the gate signal voltage of the gate bus line Gj transitions to the low level is a decrease (a change from the positive polarity to the negative polarity). Therefore, the voltage of the sub-pixel P-B(i,j) decreases due to a down-thrusting effect, and the effective voltage applied to the sub-pixel P-B(i,j) becomes less than or equal to the voltage supplied during the image write pulse Pw, thus making the sub-pixel P-B(i,j) a dark sub-pixel.

On the other hand, about a ½ frame after the gate signal voltage of the gate bus line Gj is at the high level, the gate signal voltage of the gate bus line Gj+1 transitions to the high level, and at this time the source signal voltage having the positive polarity is supplied to the source bus line Si. Thus, the voltage of the sub-pixel P-B(i,j+1) is positive. Since the first change of the oscillating voltage of the CS bus line CS-B after the gate signal voltage of the gate bus line Gj+1 transitions to the low level is an increase (a change from the negative polarity to the positive polarity), the voltage of the sub-pixel P-B(i,j+1) increases due to an up-thrusting effect, and the effective voltage applied to the sub-pixel P-B(i,j+1) becomes greater than or equal to the voltage supplied during the image write pulse Pw, thus making the sub-pixel P-B(i,j+1) a bright sub-pixel.

As described above, the CS voltage has such a waveform that the effect of increasing or decreasing the effective voltage of one of the two sub-pixels of the pixel connected to the gate bus line Gj selected in the first sub-vertical scanning period that is associated with the CS bus line to which the CS voltage is supplied is opposite to the effect of increasing or decreasing the effective voltage of one of the two sub-pixels of the pixel connected to the gate bus line Gj+1 selected in the second sub-vertical scanning period that is associated with the CS bus line to which the CS voltage is supplied.

Note that in the liquid crystal display device 100 of the present embodiment, as shown in FIG. 12(a), interlaced scanning is performed so as to scan pixels along odd-numbered rows after which interlaced scanning is performed so as to scan pixels along even-numbered rows in the N$^{th}$ frame, and the source signal voltage of the same polarity is supplied to the source bus line over the N$^{th}$ frame (one vertical scanning period). With interlaced scanning of pixels described above, bright sub-pixels and dark sub-pixels can be each arranged in a checkered pattern as shown in FIG. 13(a). Since a human tends to identify pixels or boundaries being centered around a bright portion, the display may appear with non-uniformity if one views an image where bright sub-pixels are unevenly distributed as shown in FIG. 5(a), which was referred to in Embodiment 1 described above. In contrast, in the liquid crystal display device 100 of the present embodiment, bright sub-pixels are arranged in a checkered pattern as shown in FIG. 13(a), and it is possible to suppress the display non-uniformity.

Note that where the sequence of source signal voltage includes two consecutive vertical scanning periods differing from each other in terms of the polarity of the source signal voltage, and the first sub-vertical scanning period and the second sub-vertical scanning period, which belong to the same vertical scanning period, are the same in terms of the polarity of the source signal voltage, as illustrated herein, it suffices if the polarity of the CS voltage changes an odd number of times during a period from the point in time when the gate signal voltage supplied to the gate bus line Gj changes from the high level to the low level in the first sub-vertical scanning period until the point in time when the gate signal voltage supplied to the gate bus line Gj+1 changes from the high level to the low level in the second sub-vertical scanning period. Note that taking into consideration the blunting of the oscillating waveform of the CS voltage, it is more preferred that the interval between polarity inversions of the CS voltage (half the oscillation cycle) is 5H or more. In practice, the signal delay can be simulated based on the resistance value and the capacitance value of the CS bus line during the design phase, and the interval between polarity inversions of the CS voltage can be determined so that the degree of achievement of the CS voltage at the point in time when the corresponding gate signal voltage is turned OFF is 97% or more, more preferably 99% or more.

Note that while the CS voltage is illustrated herein as being an oscillating voltage having a waveform oscillating with a duty cycle of 1:1, it suffices if the polarity of the CS voltage changes an odd number of times, and therefore it suffices if the polarity changes at least once. Note however that if CS bus lines are arranged as described above, there is obtained an advantage that the oscillation cycle of the oscillating voltage applied to the storage capacitor counter electrode via the CS bus line can be elongated by providing a plurality of electrically independent CS trunks and connecting a plurality of CS bus lines to each CS trunk, as described in the Publication WO2006/070829A1 pamphlet.

Embodiment 3

While the polarity of the source signal voltage is not inverted within the same frame in the description above, the present invention is not limited to this. The polarity of the source signal voltage may be inverted within the same frame.

A third embodiment of the liquid crystal display device according to the present invention will now be described with reference to FIG. 14 and FIG. 15. Note that the liquid crystal display device 100 of the present embodiment has a similar configuration to that of the liquid crystal display device of Embodiment 2 except that the polarity of the source signal voltage is inverted every half frame (field), and description that is redundant with Embodiments 1 and 2 will be omitted below in order to avoid redundancy.

As does the liquid crystal display device of Embodiment 2, the liquid crystal display device 100 of the present embodiment performs gate bus line interlaced scanning driving (interlaced driving) together with source line inversion driving. Note however that the liquid crystal display device 100 of the present embodiment differs from the liquid crystal display device of Embodiment 2 in that a sequence of source signal voltage includes two consecutive sub-vertical scanning periods differing from each other in terms of the polarity of the source signal voltage, and the first sub-vertical scanning period and the second sub-vertical scanning period, which belong to the same vertical scanning period, differ from each other in terms of the polarity of the source signal voltage. Moreover, it differs from the liquid crystal display device of Embodiment 2 in that the polarity of the CS voltage changes an even number of times during a period from the point in time when the gate signal voltage supplied to the gate bus line Gj changes from the high level to the low level in the first sub-vertical scanning period until the point in time when the gate signal voltage supplied to the gate bus line Gj+1 changes from the high level to the low level in the second sub-vertical scanning period.

FIG. 14(a) shows the order in which pixels are scanned over two consecutive frames (the $N^{th}$ frame and the $N+1^{th}$ frame) and the polarities of the source signal voltages corresponding to the pixels. Moreover, FIG. 14(b) shows a timing diagram showing the source signal voltage supplied to the source bus line Si and the gate signal voltages supplied to the gate bus lines G1 to Gn over two consecutive frames. In FIG. 14, each frame is divided into two periods (the first ½ frame and the latter ½ frame). Moreover, the polarity of the source signal voltage is inverted between two periods included in the same frame. Herein, the first ½ frame and the latter ½ frame are each referred to also as a field, and the liquid crystal display device 100 of the present embodiment inverts the polarity of the source signal voltage every field.

In the first ½ frame (the first sub-vertical scanning period) of the $N^{th}$ frame, the image write pulse Pw, which brings the gate signal voltage Vgj from VgL (the low level) to VgH (the high level) for a predetermined period, is applied successively to gate bus lines Gj of odd-numbered rows, for example. That is, in the first ½ frame, the source signal voltage is supplied to pixels of all the odd-numbered rows, i.e., the first row, the third row, . . . .

In the latter ½ frame (the second sub-vertical scanning period) of the $N^{th}$ frame, the image write pulse Pw, which brings Vgj from VgL to VgH for a predetermined period, is applied successively to gate bus lines Gj+1 of even-numbered rows. That is, in the latter ½ frame, the source signal voltage is supplied to pixels of all the even-numbered rows, i.e., the second row, the fourth row, . . . . This scanning is similar to that of Embodiment 2 described above.

A source signal voltage having a positive polarity with respect to the intermediate value Vsc of the source signal voltage is supplied to the source bus line Si in the first ½ frame of the $N^{th}$ frame, and a source signal voltage having a negative polarity is supplied thereto in the following, latter ½ frame. Note that in the same sub-vertical scanning period, the polarity of the source signal voltage supplied to the source bus line Si+1 adjacent to the source bus line Si is opposite to the polarity of the source signal voltage supplied to the source bus line Si. Similarly, the polarity of the source signal voltage supplied to the source bus line Si+2 is opposite to the polarity of the source signal voltage supplied to the source bus line Si+1.

In the first ½ frame of the $N+1^{th}$ frame, a source signal voltage having the positive polarity with respect to the intermediate value Vsc is supplied to the source bus line Si. Then, in the latter ½ frame of the $N+1^{th}$ frame, a source signal voltage having the negative polarity is supplied to the source bus line Si.

FIG. 15(a) shows the polarity and the bright/dark status of sub-pixels of four rows and four columns of pixels. As shown in FIG. 15(a), although the liquid crystal display device 100 of the present embodiment performs source line inversion driving, the bright/dark statuses and the polarities of sub-pixels are similar to those of the conventional dot inversion driving shown in FIG. 24(a), where bright sub-pixels and dark sub-pixels are each arranged in a checkered pattern. Therefore, since bright sub-pixels are not unevenly distributed, it is possible to suppress the display non-uniformity.

FIG. 15(b) shows a timing diagram showing the CS voltage Vcs-B, the source signal voltage Vsi, the gate signal voltage Vgj, the voltage Vp-B(i,j) of the sub-pixel P-B(i,j), the gate signal voltage Vgj+1, and the voltage Vp-B(i,j+1) of the sub-pixel P-B(i,j+1) in the liquid crystal display device 100.

The CS voltage Vcs-B supplied to the CS bus line CS-B has an oscillating waveform whose polarity is inverted with respect to the counter voltage Vcom with a constant cycle. The oscillating waveform is, for example, a rectangular wave having a duty cycle of 1:1 as shown in the figure.

Since the source signal voltage supplied to the source bus line Si when the gate signal voltage of the gate bus line Gj is at the high level is positive, the voltage of the sub-pixel P-B(i,j) is positive. The CS voltage Vcs-B supplied to the CS bus line CS-B has an oscillating waveform whose polarity is inverted with respect to the counter voltage Vcom with a constant cycle (for example, a rectangular wave having a duty cycle of 1:1 as shown in the figure), and the first change of the oscillating voltage Vcs-B of the CS bus line CS-B after the gate signal voltage of the gate bus line Gj transitions to the low level is a decrease (a change from the positive polarity to the negative polarity). Therefore, the voltage of the sub-pixel P-B(i,j) decreases due to a down-thrusting effect, and the effective voltage applied to the sub-pixel P-B(i,j) becomes less than or equal to the voltage supplied during the image write pulse Pw, thus making the sub-pixel P-B(i,j) a dark sub-pixel.

On the other hand, since a source signal voltage having a negative polarity is supplied to the source bus line Si when the gate signal voltage of the gate bus line Gj+1 is at the high level, the voltage of the sub-pixel P-B(i,j+1) is negative. Since the first change of the oscillating voltage of the CS bus line CS-B after the gate signal voltage of the gate bus line Gj+1 transitions to the low level is a decrease (a change from the positive polarity to the negative polarity), the voltage of the sub-pixel P-B(i,j+1) decreases due to a down-thrusting effect, and the effective voltage applied to the sub-pixel P-B(i,j+1) becomes greater than or equal to the voltage supplied during the image write pulse Pw, thus making the sub-pixel P-B(i,j+1) a bright sub-pixel.

In this way, the CS voltage has such a waveform that the effect of increasing or decreasing the effective voltage of one of the two sub-pixels of the pixel connected to the gate bus line Gj selected in the first sub-vertical scanning period that is associated with the CS bus line to which the CS voltage is supplied is opposite to the effect of increasing or decreasing the effective voltage of one of the two sub-pixels of the pixel connected to the gate bus line Gj+1 selected in the second sub-vertical scanning period that is associated with the CS bus line to which the CS voltage is supplied.

Where the sequence of source signal voltage includes two consecutive sub-vertical scanning periods differing from each other in terms of the polarity of the source signal voltage, and the first sub-vertical scanning period and the second sub-vertical scanning period, which belong to the same vertical scanning period, differ from each other in terms of the polarity of the source signal voltage, as illustrated herein, it suffices if the polarity of the CS voltage changes an even number of times during a period from the point in time when the gate signal voltage supplied to the gate bus line Gj changes from the high level to the low level in the first sub-vertical scanning period until the point in time when the gate signal voltage supplied to the gate bus line Gj+1 changes from the high level to the low level in the second sub-vertical scanning period.

Note that taking into consideration the blunting of the oscillating waveform of the CS voltage, it is more preferred that the interval between polarity inversions of the CS voltage (half the oscillation cycle) is 5H or more. In practice, the signal delay can be simulated based on the resistance value and the capacitance value of the CS bus line during the design phase, and the interval between polarity inversions of the CS voltage can be determined so that the degree of achievement of the CS voltage at the point in time when the corresponding gate signal voltage is turned OFF is 97% or more, more preferably 99% or more.

While an oscillating voltage having a waveform that oscillates with a duty cycle of 1:1 is used herein as the CS voltage, the present invention is not limited to this. It suffices if the polarity changes an even number of times, and therefore it suffices if the polarity changes at least twice. Note however that if CS bus lines are arranged as described above, there is obtained an advantage that the oscillation cycle of the oscillating voltage applied to the storage capacitor counter electrode via the CS bus line can be elongated by providing a plurality of electrically independent CS trunks and connecting a plurality of CS bus lines to each CS trunk, as described in the International Publication WO2006/070829A1 pamphlet.

As described above, in the liquid crystal display device 100 of the present embodiment, bright sub-pixels and dark sub-pixels are arranged in a checkered pattern to thereby prevent a deterioration in the display quality such as the non-uniformity feel, while enjoying the advantage of the source line inversion driving.

Note that while the liquid crystal display devices of Embodiments 2 and 3 described above scan pixels along even-numbered rows after scanning pixels along odd-numbered rows, the liquid crystal display device of the present invention is not limited to this. Pixels along odd-numbered rows may be scanned after scanning pixels along even-numbered rows.

Embodiment 4

Figure 16:
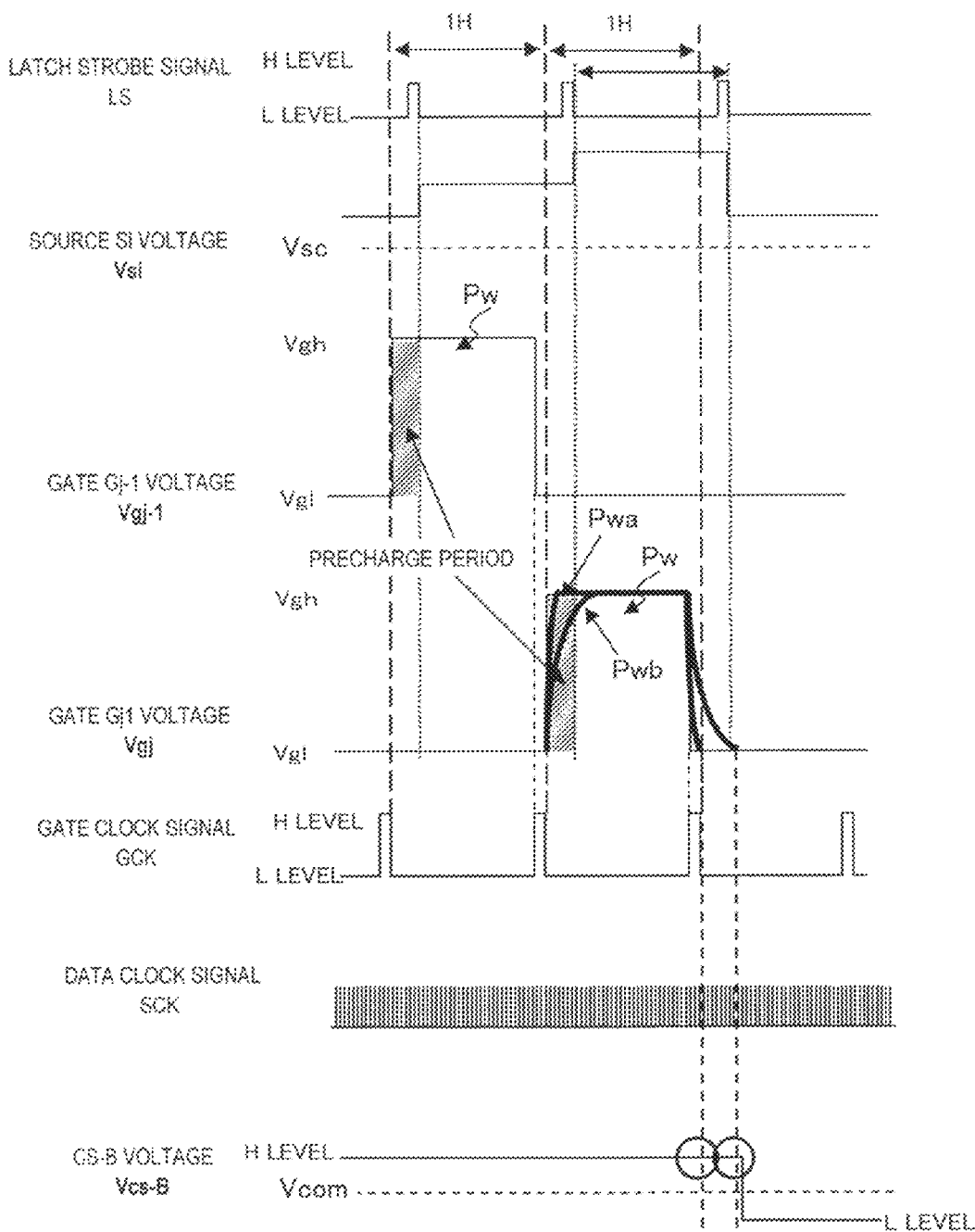
FIG. 16 A timing diagram showing the latch strobe signal LS, the source signal voltage Vsi, the gate signal voltages Vgj−1 and Vgj, the gate clock signal GCK, the data clock signal SCK and the CS voltage Vcs-B in the fourth embodiment of the liquid crystal display device according to the present invention.

Referring to FIG. 16, a fourth embodiment of the liquid crystal display device according to the present invention will now be described. Note that the liquid crystal display device 100 of the present embodiment has a similar configuration to those of the liquid crystal display devices of Embodiments 1 to 3 described above except that the polarity of the CS voltage is inverted in synchronism with the data clock signal SCK, and redundant description will be omitted below in order to avoid redundancy. Note that as described above with reference to FIG. 2, the display control circuit 160 of the liquid crystal display device 100 of the present embodiment outputs the data clock signal SCK to the CS control circuit 150.

FIG. 16 shows a timing diagram showing the latch strobe signal LS, the source signal voltage Vsi, the gate signal voltages Vgj−1 and Vgj, the gate clock signal GCK, the data clock signal SCK and the CS voltage Vcs-B in the liquid crystal display device 100 of the present embodiment.

The liquid crystal display device 100 inverts the polarity of the CS voltage in synchronism with the pulse of the data clock signal SCK whose cycle and pulse width are shorter than those of the gate clock signal GCK. Thus, the polarity of the CS voltage Vcs-B can be inverted from a predetermined level after the pulse Pwb of the gate electrode transitions to Vgl, and it is possible to suppress the occurrence of bright/dark inversions.

Moreover, since the frequency of the waveform of the data clock signal SCK is higher than the frequency of the gate clock signal GCK, the polarity of the CS voltage Vcs-B can be inverted at an arbitrary timing during a period after the gate clock signal GCK once transitions to the low level until it next transitions to the high level. For example, with a 37-inch FHD in which the frequency of the data clock signal SCK is 148.5 MHz, the polarity of the CS voltage Vcs-B can be controlled so as to be inverted about 2 μs after the fall of the pulse of the gate clock signal GCK by inverting the CS voltage Vcs-B from the high level to the low level after the passage of about 300 cycles of the data clock signal SCK since the fall of the pulse of the gate clock signal GCK.

Note that while it will be necessary to count the number of pulses of the data clock signal SCK for setting the timing at which the polarity of the CS voltage Vcs-B is inverted, this can be implemented by using a known counting circuit. In this case, since the polarity of the CS voltage Vcs-B is inverted in synchronism with the pulse of the data clock signal SCK, there is no need to input the gate clock signal GCK to the CS control circuit 150 (see FIG. 2). However, since the frequency of the data clock signal SCK is higher than the frequency of the gate clock signal GCK, the scale of the counting circuit needed will be large if only the number of pulses of the data clock signal SCK is counted. Therefore, it is preferred that the number of pulses of the data clock signal SCK is counted after the pulse of the gate clock signal GCK falls.

In this way, it is possible to more precisely adjust the timing at which the polarity of the CS voltage is inverted by inverting the polarity of the CS voltage in synchronism with the data clock signal SCK whose frequency is higher than those of the gate clock signal GCK and the latch strobe signal LS, which transition to the high level every horizontal scanning period. Moreover, where the polarity of the CS voltage is inverted in synchronism with the data clock signal SCK, it is possible to suppress the increase in the scale of the counting circuit by determining the timing at which the polarity of the CS voltage is inverted by using the counting circuit to count the pulses of the data clock signal SCK after the pulse of the gate clock signal GCK, which rises in synchronism with the fall of the image write pulse, falls.

Embodiment 5

While the polarity of the CS voltage is inverted in synchronism with the pulse of the data clock signal SCK in the description above, the present invention is not limited to this.

Referring to FIG. 17, a fifth embodiment of the liquid crystal display device according to the present invention will now be described. The liquid crystal display device 100 of the present embodiment has a similar configuration to that of the liquid crystal display device of Embodiment 4 except that the polarity of the CS voltage is inverted in synchronism with the fall of the next pulse of the pulse of the gate clock signal, which is in synchronism with the fall of the image write pulse of the gate signal. Therefore, redundant description will be omitted below in order to avoid redundancy.

FIG. 17 shows a timing diagram showing the latch strobe signal LS, the source signal voltage Vsi, the gate signal voltages Vgj−1 and Vgj, the gate clock signal GCK and the CS voltage Vcs-B in the liquid crystal display device 100 of the present embodiment.

While the liquid crystal display devices of Comparative Examples 1 and 2 described above with reference to FIG. 7 and FIG. 8 invert the polarity of the CS voltage Vcs-B in synchronism with the fall of the pulse of the gate clock signal GCK, which is in synchronism with the fall of the image write pulse of the gate signal, the liquid crystal display device 100 of the present embodiment inverts the polarity of the CS voltage Vcs-B in synchronism with the fall of a pulse of the gate clock signal GCK that is one horizontal scanning period (1H) after the pulse of the gate clock signal GCK that is in synchronism with the fall of the image write pulse of the gate signal, thus suppressing bright/dark inversions. Moreover, as opposed to the liquid crystal display device of Embodiment 4, the liquid crystal display device 100 of the present embodiment does not need to input the data clock signal SCK to the CS control circuit 150 (see FIG. 2), and as a result, it is possible to suppress the increase in the scale of the counting circuit for counting the data clock signal. Moreover, in this way, the voltage of the gate electrode of the TFT corresponding to the sub-pixel has certainly reached Vgl after a 1H period since the fall of the image write pulse of the gate signal, and thus the polarity of the CS voltage can be inverted appropriately.

Note that while the polarity of the CS voltage is inverted in synchronism with a pulse that is 1H after the pulse of the gate clock signal, which is in synchronism with the fall of the image write pulse of the gate signal in the description above, the present invention is not limited to this. The polarity of the CS voltage may be inverted in synchronism with a pulse that is 2H or more after the pulse of the gate clock signal, which is in synchronism with the fall of the image write pulse of the gate signal. Note however that typically, each of the CS bus lines is connected to one of a number of CS trunks, and the CS voltages of the CS bus lines are controlled by controlling the CS signal that the CS control circuit 150 (see FIG. 2) supplies to the CS trunks.

Figure 18A:
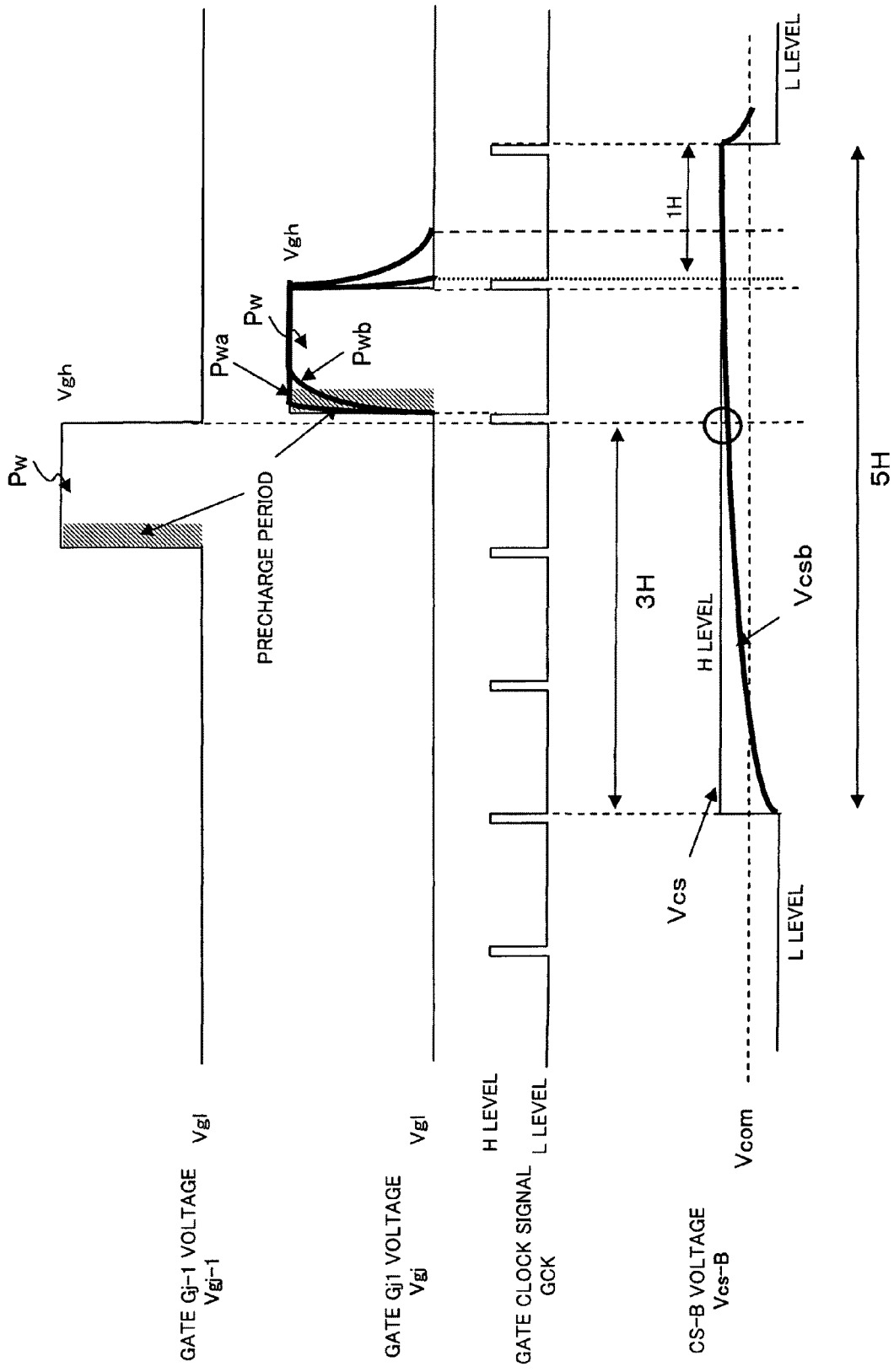
FIG. 18A A timing diagram showing the gate signal voltages Vgj−1 and Vgj, the gate clock signal GCK and the CS voltage Vcs-B where the inversion cycle of the CS voltage is relatively short in the liquid crystal display device of Embodiment 5.

Note that where the inversion of the polarity of the CS voltage is in synchronism with a pulse that is 1H after the pulse of the gate clock signal, which is in synchronism with the fall of the image write pulse of the gate signal, since the CS voltage is inverted periodically, the period from the change of the CS voltage until the fall of the image write pulse of the gate bus line Gj−1 accordingly becomes shorter. For example, where the number of CS trunks is 10 and the polarity of the CS voltage is inverted with a 5H cycle as shown in FIG. 5(b), the period from the change of the CS voltage until the fall of the image write pulse of the gate bus line Gj−1 becomes shorter than 3H as shown in FIG. 18A. Herein, the CS voltage Vcs produced in the CS control circuit 150 shown in FIG. 2, and a voltage Vcsb supplied to the storage capacitor counter electrode corresponding to the pertinent sub-pixel are designated differently. Where the period from the change of the CS voltage until the fall of the image write pulse of the gate bus line Gj−1 is short, if the voltage Vcsb is blunted as compared with the CS voltage Vcs due to the load capacitance and resistance of the CS bus line, the voltage Vcsb does not reach the desired CS voltage Vcs when the image write pulse of the gate bus line Gj−1 falls, thereby varying the brightness levels of pixels depending on the position, thus producing non-uniformity.

Figure 18B:
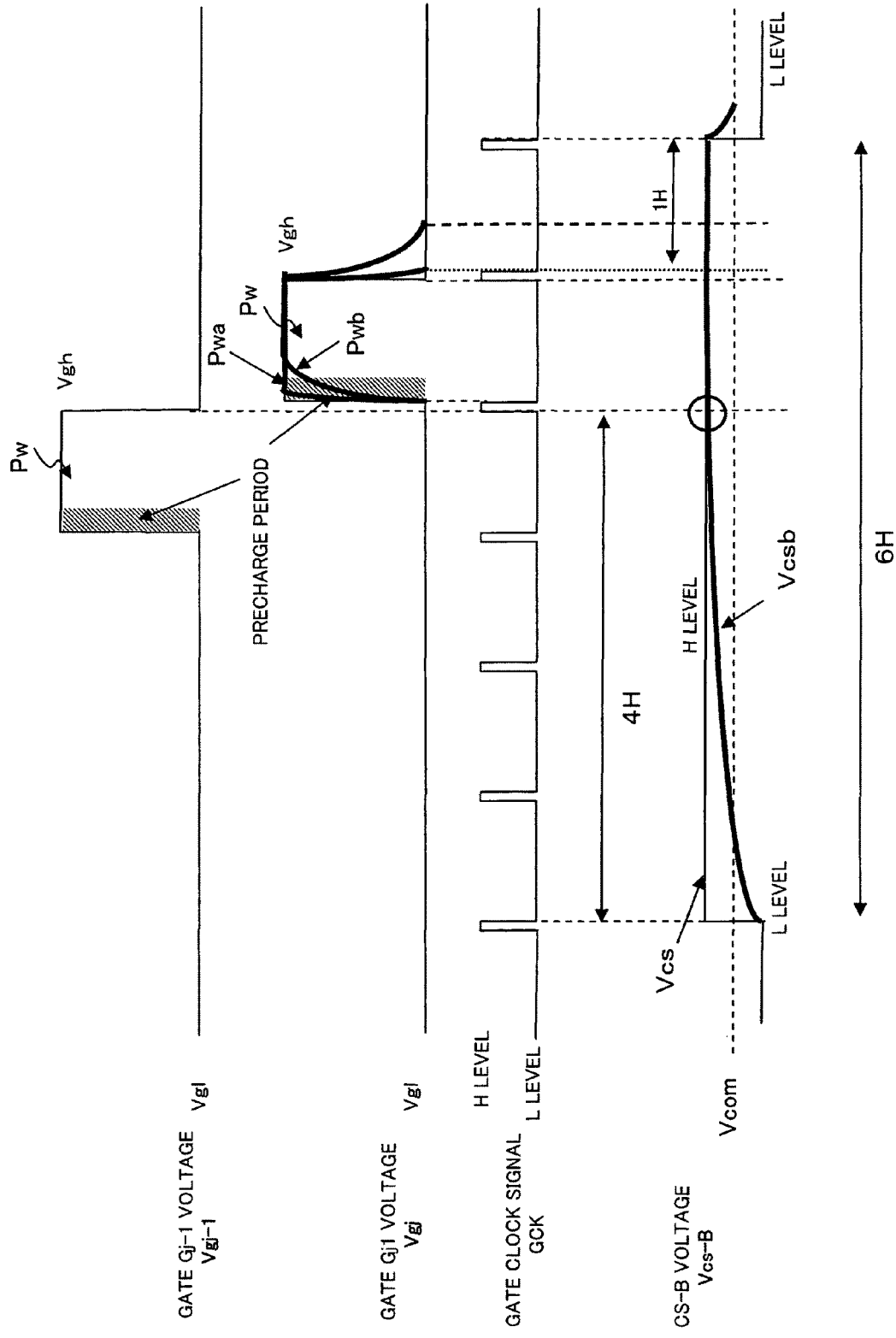
FIG. 18B A timing diagram showing the gate signal voltages Vgj−1 and Vgj, the gate clock signal GCK and the CS voltage Vcs-B where the inversion cycle of the CS voltage is relatively long in the liquid crystal display device of Embodiment 5.

For this, it is possible to suppress the variation of the brightness levels of pixels by elongating the cycle of polarity inversions of the CS voltage. For example, the period from the change of the CS voltage until the fall of the image write pulse of the gate bus line Gj−1 can be made longer than 3H by elongating the inversion cycle of the CS voltage to be 6H or more, as shown in FIG. 18B. Note however that the number of CS trunk lines needs to be 12 or more in this case.

Note that where the CS voltage is produced in the gate driver 130 (see FIG. 2), instead of the CS control circuit 150, there is no need to provide CS trunks, and the polarity inversion cycle of the CS voltage can be set relatively freely. Therefore, it is possible to relatively freely set the period from a pulse of the gate clock signal that is in synchronism with the fall of the image write pulse of the gate signal until a pulse of the gate clock signal that is in synchronism with the inversion of the polarity of the CS voltage.

Embodiment 6

While the polarity of the CS voltage is inverted in synchronism with the pulse of the data clock signal or the gate clock signal in the description above, the present invention is not limited to this.

Figure 19:
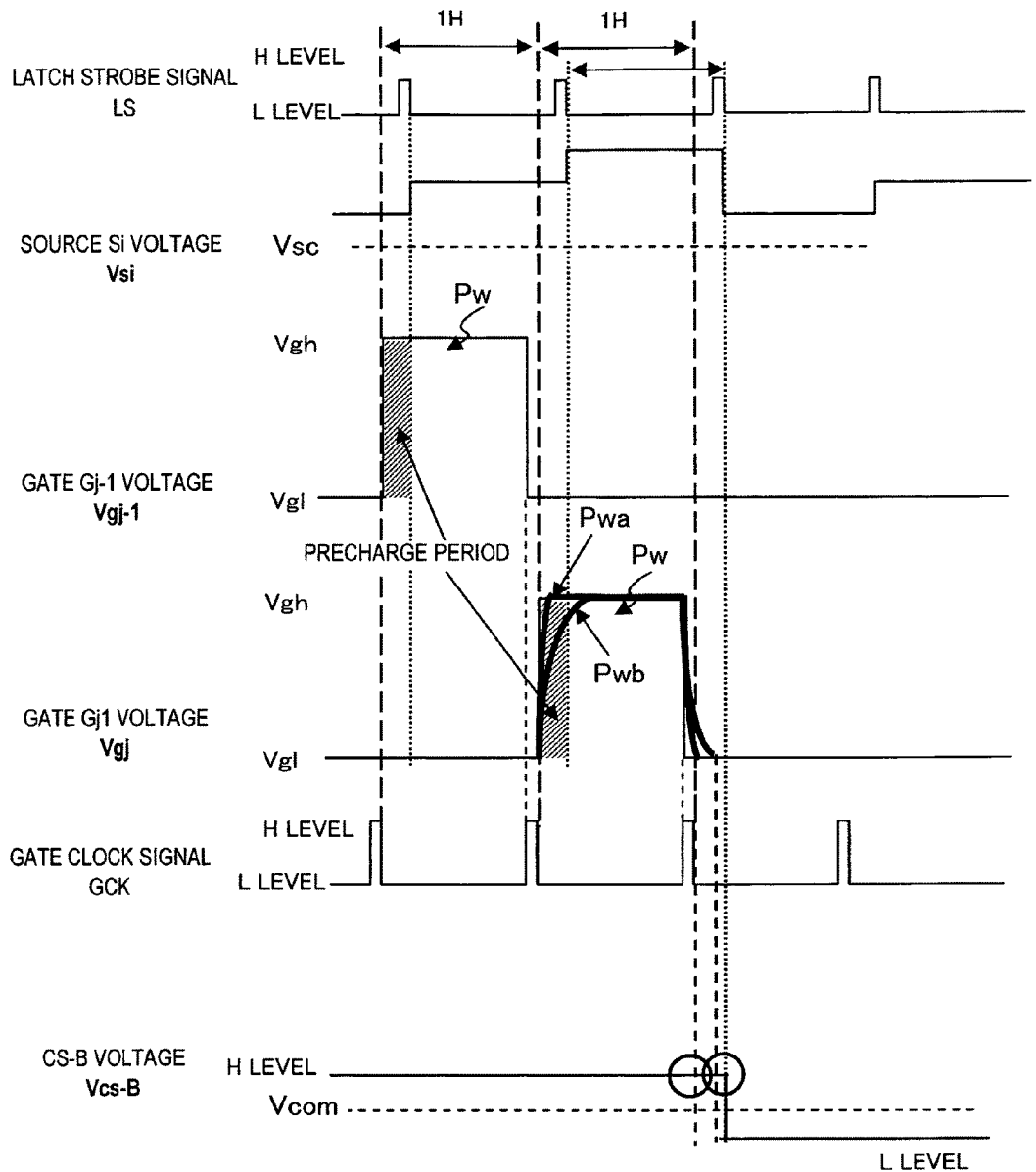
FIG. 19 A timing diagram showing the latch strobe signal LS, the source signal voltage Vsi, the gate signal voltages Vgj−1 and Vgj, the gate clock signal GCK and the CS voltage Vcs-B in the sixth embodiment of the liquid crystal display device according to the present invention.

Referring to FIG. 19, a sixth embodiment of the liquid crystal display device according to the present invention will now be described. The liquid crystal display device 100 of the present embodiment has a similar configuration to those of the liquid crystal display devices of Embodiments 4 and 5 except that the polarity of the CS voltage is inverted in synchronism with the latch strobe signal LS, and redundant description will be omitted below in order to avoid redundancy. Note that the display control circuit 160 of the liquid crystal display device 100 of the present embodiment outputs the latch strobe signal LS to the CS control circuit 150, as described above with reference to FIG. 2.

FIG. 19 shows a timing diagram showing the latch strobe signal LS, the source signal voltage Vsi, the gate signal voltages Vgj−1 and Vgj, the gate clock signal GCK and the CS voltage Vcs-B in the liquid crystal display device 100 of the present embodiment.

The CS control circuit 150 (see FIG. 2) of the liquid crystal display device 100 inverts the polarity of the CS voltage Vcs-B in synchronism with the fall of the pulse of the latch strobe signal LS. The gate clock signal GCK and the latch strobe signal LS both transition to the high level every 1H (horizontal scanning period). Where precharge driving is performed, the fall of the pulse of the latch strobe signal LS is subsequent to the fall of the pulse of the gate clock signal GCK. Therefore, if the pulse Pwa or Pwb applied to the gate electrode of the TFT corresponding to the sub-pixel transitions to Vgl while the CS voltage Vcs-B is at the high level during a period from the fall of the pulse of the gate clock signal GCK until the fall of the pulse of the latch strobe signal LS, it is possible to perform display while suppressing bright/dark inversions by inverting the polarity of the CS voltage Vcs-B in synchronism with the fall of the latch strobe signal LS. Moreover, since the period from when the pulse of the gate clock signal GCK falls until the pulse of the latch strobe signal LS falls is a period of 1H or less, the polarity of the CS voltage can be inverted within a period of 1H or less since the fall of the pulse of the gate clock signal GCK. In this case, there is no need to unnecessarily elongate the inversion cycle of the polarity of the CS voltage, and it is therefore possible to suppress the increase in the number of CS trunks as described above in Embodiment 5.

Note that while the liquid crystal display devices of Embodiments 1 to 6 described above perform the source line inversion driving so that the polarity of the source signal voltage is not inverted at least over one field period, the present invention is not limited to this. The display area may be divided into a plurality of blocks so that one block includes some of all rows of pixels, and driving may be performed so that the polarity of the source signal voltage is not inverted over a period in which scanning of pixels in a block is proceeding in one direction. Driving such that the polarity of the source signal voltage is not inverted over a plurality of horizontal scanning periods is called nH inversion driving.

As described above with reference to FIG. 12 to FIG. 15, if frame inversion driving is performed, an image from one frame before is displayed for ½F (frame) within each frame. For example, assuming that pixels along odd-numbered rows are scanned in the first sub-frame, and pixels along even-numbered rows are scanned in the latter, second sub-frame, in the first sub-frame, an image of the current frame is displayed on pixels along odd-numbered rows and an image from one frame before is displayed on pixels along even-numbered rows.

Therefore, if a motion video is displayed in which a vertical bar moves in the lateral direction, there may occur a problem (combing) in which edges of the vertical bar appear as comb-like patterns. The degree to which such a problem is visually perceived is determined by the proportion of the amount of time (denoted as "Tc") for which such a state exists with respect to the total display time. Tc is the time interval between the scans of adjacent rows of pixels (e.g., the difference between the time when pixels along the $j^{th}$ row are scanned and the time when pixels along the $j+1^{th}$ row are scanned). Therefore, while there is no problem if the frame frequency is sufficiently high with respect to the moving speed, there may be a problem if the moving speed is high or the frame frequency is low. For example, if interlaced scanning is performed with a display signal having a frame frequency of 120 Hz (a frame period of 8.33 ms) over two separate sub-frames, the interval Tc between the sub-frame in which pixels along odd-numbered rows are scanned and the sub-frame in which pixels along even-numbered rows are scanned is 4167 μs, which is equal to one half of the frame period (i.e., the length of the sub-frame period). That is, Tc/one frame period×100=50 holds. Here, since one frame period typically means one vertical scanning period, Tc/one frame period×100=50 holds.

In order for the combing not to be visually perceived, it is preferred that this value (Tc/one frame period)×100 is 7 or less, more preferably 5 or less, for 60H driving, or is 14 or less, more preferably 10 or less, for 120 driving. In terms of the value of Tc, it is preferably 1.2 ms or less, more preferably 0.8 ms or less, irrespective of the frame frequency.

In view of this, one frame may be divided into many segments so as to reduce the amount of time (Tc) for which the current frame and the previous frame coexist together, thereby preventing the combing from being visually perceived. For example, scanning may be performed by going back a rows each time α consecutive gate bus lines are scanned in interlaced scanning (each time the scanning position moves over 2α rows) in the following order: odd-numbered row→even-numbered row→even-numbered row→odd-numbered row→odd-numbered row→even-numbered row→.... For initial scanning, the operation goes back a rows after scanning α/2 rows (after moving over α rows). To be exact, the number of rows the operation goes back is α−3 rows in the case of odd-numbered row→even-numbered row, and α−1 rows in the case of even-numbered row→odd-numbered row in light of the interlaced scanning.

The scanning described above includes a first sub-frame in which pixels along a first set of odd-numbered rows (the number of rows: Nsv=α/2) are progressively scanned, a second sub-frame in which pixels along even-numbered rows (Nsv rows) that have been skipped in the first sub-frame are progressively scanned, a third sub-frame in which pixels along a set of consecutive even-numbered rows (Nsv rows), which starts from an even-numbered row that follows the last even-numbered row scanned in the second sub-frame, are progressively scanned, and a fourth sub-frame in which pixels along odd-numbered rows (Nsv rows) that have been skipped in the third sub-frame are progressively scanned. Scanning is similarly repeated after the fourth sub-frame, thus displaying one frame of image.

Also where such nH inversion driving is performed, the precharge driving method may be performed, and the polarity of the CS voltage may be inverted after the rise of the image write pulse of the gate signal, instead of in synchronism with the rise of the image write pulse of the gate signal. Thus, it is possible to suppress the occurrence of bright/dark inversions, and to suppress the occurrence of combing.

Figure 20:
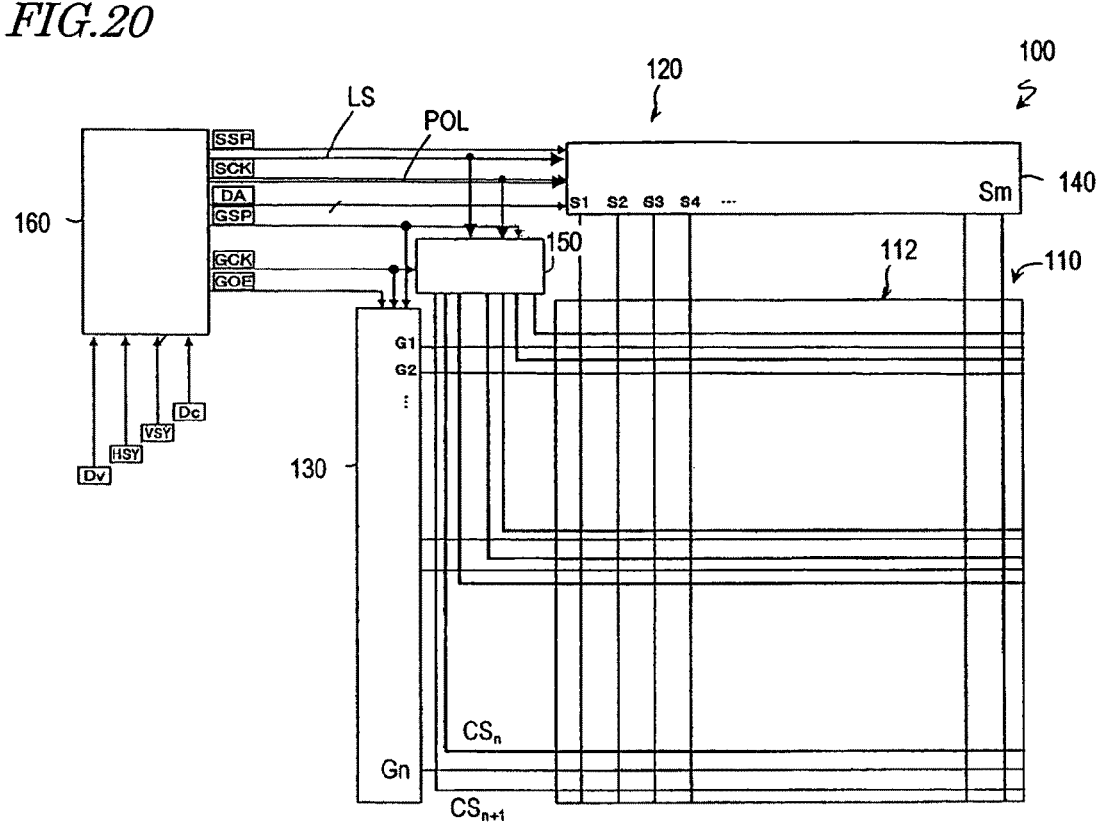
FIG. 20 A schematic diagram showing a variation of an embodiment of the liquid crystal display device according to the present invention.

Note that while the gate drivers 130*a* and 130*b* (see FIG. 2) are provided at opposite ends of the gate bus lines in the liquid crystal display devices of Embodiments 1 to 6 described above, the present invention is not limited to this. The gate driver 130 may be provided only at one end of the gate bus lines, as shown in FIG. 20.

Figure 21:
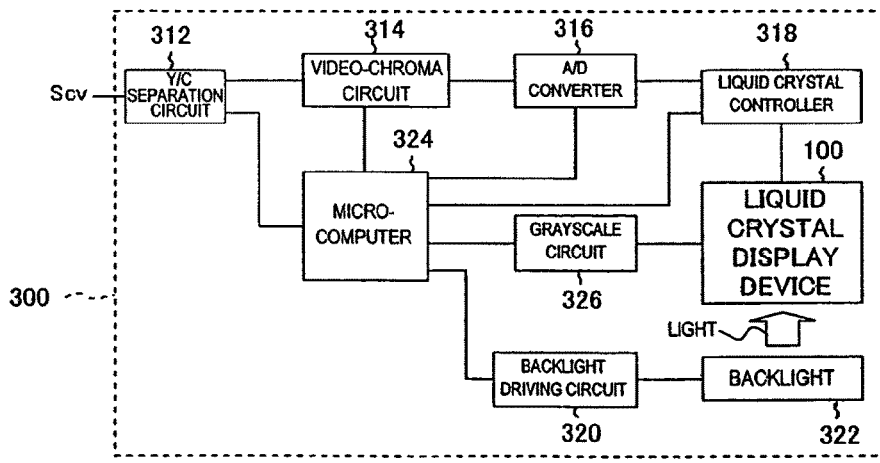
FIG. 21 A block diagram showing a configuration of a television set including the liquid crystal display device of the present embodiment.

Moreover, the liquid crystal display device 100 of Embodiments 1 to 6 may be used in a television set (receiver). FIG. 21 is a block diagram showing a configuration of a television set 300 including the liquid crystal display device 100. The television set 300 includes the liquid crystal display device 100, a Y/C separation circuit 312, a video-chroma circuit 314, an A/D converter 316, a liquid crystal controller 318, a backlight driving circuit 320, a backlight 322, a microcomputer 324, and a grayscale circuit 326. Note that the liquid crystal display device 100 includes the liquid crystal panel 110 having a plurality of pixels arranged in a matrix pattern, and the driver 120 for driving the liquid crystal panel 110.

In the television set 300, first, a composite color video signal Scv as a television signal is input from outside to the Y/C separation circuit 312, where it is separated into a luminance signal and a color signal. The luminance signal and the color signal are converted, in the video-chroma circuit 314, to an analog RGB signal corresponding to the three primary colors of light, and the analog RGB signal is converted by the A/D converter 316 to a digital RGB signal. The digital RGB signal is input to the liquid crystal controller 318. Moreover, the Y/C separation circuit 312 also extracts horizontal and vertical sync signals from the composite color video signal Scv received from outside, and these sync signals are also input to the liquid crystal controller 318 via the microcomputer 324.

The liquid crystal controller 318 outputs a driver data signal based on the digital RGB signal (equivalent to the digital video signal Dv described above) from the A/D converter 316. Moreover, the liquid crystal controller 318 produces, based on the sync signals, timing control signals for operating the gate driver 130 and the source driver 140 of the liquid crystal display device 100 (see FIG. 2) as described in the embodiments above, and gives these timing control signals to the gate driver 130 and the source driver 140. Moreover, in the grayscale circuit 326, a grayscale voltage is produced for each of the three primary colors R, G and B of color display, and these grayscale voltages are also supplied to the liquid crystal display device 100.

The liquid crystal display device 100 produces, in the gate driver 130, the source driver 140, etc., driving signals (the data signal, the gate signal, etc.) based on the driver data signal, the timing control signals and the grayscale voltages, and a color image is displayed on the liquid crystal panel 110 based on these driving signals. Note that in order to display an image with the liquid crystal display device 100, it is necessary to illuminate with light the liquid crystal display device 100 from the back side. In the television set 300, the backlight driving circuit 320 drives the backlight 322 under the control of the microcomputer 324 to thereby illuminate with light the rear side of the liquid crystal display device 100.

The microcomputer 324 controls the entire system, including the processes described above. Note that as the video signal (composite color video signal) received from outside, not only a video signal based on a television broadcast, but also a video signal obtained by a camera, a video signal distributed via an Internet connection, etc., may be used, and the television set 300 is capable of displaying images based on various video signals.

Figure 22:
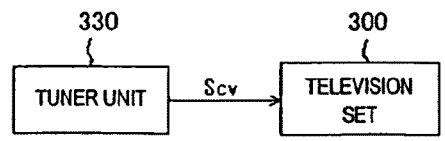
FIG. 22 A block diagram showing a configuration of a television set to which a tuner unit is connected.

In order to display an image based on a television broadcast with the television set 300 having such a configuration, a tuner unit 330 is connected to the television set 300 as shown in FIG. 22. The tuner unit 330 extracts a signal of a channel that is supposedly received from among the received waves (high frequency signals) received via an antenna (not shown), converts the signal to an intermediate frequency signal, and detects the intermediate frequency signal to thereby take out the composite color video signal Scv as the television signal. The composite color video signal Scv is input to the television set 300 as described above, and an image based on the composite color video signal Scv is displayed by the television set 300.

Note that while the liquid crystal display devices of Embodiments 1 to 6 described above have a type of a multi-pixel structure in which a CS bus line is shared by sub-pixels that are adjacent to each other in the column direction while belonging to different pixels, the present invention is not limited to this. The liquid crystal display device can be applied to a configuration where an electrically independent CS bus line is provided for each sub-pixel, and is not limited by the relationship between CS bus lines and sub-pixels. Note that if a multi-pixel structure other than that of the type where a CS bus line is shared by adjacent sub-pixels as described above is employed, the degree of freedom in selecting the CS voltage is high, and the waveform of each CS voltage can be set individually.

Moreover, while the CS control circuit 150 shown in FIG. 2 itself produces the CS signal, the present invention is not limited to this. The CS signal may be produced by the gate driver 130 (see FIG. 2) based on a signal from the CS control circuit 150. In this case, since the gate driver 130 outputs a CS signal to each storage capacitor bus line, there is no need to provide CS trunks, and the polarity inversion cycle of the CS voltage can be set relatively freely.

While the embodiments above have been directed to cases where a combination of slits on the pixel electrode and slits on the counter electrode is used as the domain regulating means, the present invention is not limited to this. The present invention is applicable also to liquid crystal display devices which use a combination of slits on the pixel electrode and slits on the counter electrode (specifically, referred to also as the PVA: Patterned Vertical Alignment mode), and the present invention is further applicable also to liquid crystal display devices of other VA modes such as the CPA (Continuous Pinwheel Alignment) mode.

Moreover, while the description herein has been directed to cases where the direction in which source bus lines extend is the column direction (the vertical direction of the display screen) and the direction in which gate bus lines extend is the row direction (the horizontal direction of the display screen), the embodiments of the present invention are not limited to this, and it is understood that liquid crystal display devices in which the display screen is rotated by 90° are also included in the embodiments of the present invention.

Note that the entire disclosure of Japanese Patent Application No. 2007-119169, on which the present application claims priority, is hereby incorporated by reference.

INDUSTRIAL APPLICABILITY

The liquid crystal display device according to the present invention is suitably used in applications where high-quality display is desired, such as liquid crystal TVs.

The invention claimed is:
1. A liquid crystal display device, comprising:
a plurality of pixels arranged in a matrix pattern of a plurality of rows and a plurality of columns, each pixel including a first sub-pixel and a second sub-pixel capable of exhibiting different brightnesses at least at a certain gray level;
a plurality of source bus lines each associated with pixels along one of the plurality of columns;
a plurality of gate bus lines each associated with pixels along one of the plurality of rows;
a plurality of TFTs each associated with at least one of the first sub-pixel and the second sub-pixel of one of the plurality of pixels; and
a plurality of storage capacitor bus lines each associated at least with one of the first sub-pixel and the second sub-pixel of each pixel along one of the plurality of rows, wherein
each of the first sub-pixel and the second sub-pixel includes a liquid crystal capacitor and a storage capacitor,
a storage capacitor bus line associated with the storage capacitor of the first sub-pixel of one of the plurality of pixels is electrically independent of a storage capacitor bus line associated with the storage capacitor of the second sub-pixel of the pixel;
a source driver configured to supply source signals to the source bus lines so that when polarities of source signal voltages applied to the plurality of source bus lines do not change over a plurality of horizontal scanning periods, an image write pulse of a gate signal supplied to a gate bus line that corresponds to pixels along a $j^{th}$ row rises before the source signal voltages applied to the plurality of source bus lines change to values that correspond to pixels along the $j^{th}$ row;
the source driver configured to supply the source signals to the source bus lines so that after the source signal voltages change to values that correspond to pixels along the $j^{th}$ row, the image write pulse of the gate signal supplied to a gate bus line that corresponds to pixels along the $j^{th}$ row falls, and then the image write pulse of the gate signal supplied to a gate bus line that corresponds to pixels along a $k^{th}$ row (j≠k) to be scanned next rises; and a control circuit configured to supply storage capacitor signal voltages to the storage capacitor bus lines so that polarities of the storage capacitor signal voltages applied to storage capacitor bus lines that correspond to sub-pixels of pixels along the $j^{th}$ row are inverted after the image write pulse of the gate signal supplied to a gate bus line that corresponds to pixels along the $k^{th}$ row rises, instead of in synchronism with the rise of the image write pulse of the gate signal supplied to the gate bus line that corresponds to pixels along the $k^{th}$ row.

2. The liquid crystal display device of claim 1, further comprising:
a gate driver configured to supply gate signals so that an image write pulse of one of the gate signals of a corresponding one of the plurality of gate bus lines rises in synchronism with a fall of a pulse of a gate clock signal, and the image write pulse falls in synchronism with a rise of the next pulse of the gate clock signal.

3. The liquid crystal display device of claim 2, wherein the control circuit is configured to supply the storage capacitor signal voltages to the storage capacitor bus lines so that the polarities of the storage capacitor signal voltages are inverted in synchronism with a data clock signal having a higher frequency than the gate clock signal.

4. The liquid crystal display device of claim 3, further comprising a counting circuit for counting the number of pulses of the data clock signal,
wherein the control circuit is configured to supply the storage capacitor signal voltages to the storage capacitor bus lines so that the polarities of the storage capacitor signal voltages are inverted based on the number of pulses of the data clock signal, which has been counted by the counting circuit since the fall of the next pulse of the gate clock signal.

5. The liquid crystal display device of claim 2, wherein
the source driver is configured to supply the source signals to the source bus lines so that the source signal voltages change in synchronism with a fall of a pulse of a latch strobe signal; and
a fall of the pulse of the gate clock signal in synchronism with the rise of the image write pulse of the gate signal corresponding to pixels along the $j^{th}$ row is prior to the fall of the pulse of the latch strobe signal in synchronism with the change of the source signal voltages to values that correspond to pixels along the $j^{th}$ row.

6. The liquid crystal display device of claim 5, wherein the control circuit is configured to supply the storage capacitor signal voltages to the storage capacitor bus lines so that the polarities of the storage capacitor signal voltages applied to storage capacitor bus lines that correspond to sub-pixels of pixels along the $j^{th}$ row are inverted in synchronism with the fall of the pulse of the latch strobe signal in synchronism with the change of the source signal voltages to values that correspond to pixels along the $k^{th}$ row.

7. The liquid crystal display device of claim 2, wherein the control circuit is configured to supply the storage capacitor signal voltages to the storage capacitor bus lines so that the polarities of the storage capacitor signal voltages are inverted in synchronism with a pulse subsequent to the next pulse of the gate clock signal.

8. The liquid crystal display device of claim 1, wherein at least one of the plurality of storage capacitor bus lines is associated with the first sub-pixel of each pixel along a certain one of the plurality of rows and the second sub-pixel of each pixel along another row that is adjacent in a column direction to the certain row.

9. The liquid crystal display device of claim 1, wherein the $k^{th}$ row is a $j+1^{th}$ row.

10. The liquid crystal display device of claim 1, wherein the $k^{th}$ row is a $j+2^{th}$ row.

11. The liquid crystal display device of claim 10, wherein
the control circuit is configured to supply the storage capacitor signal voltages to the storage capacitor bus lines so that the storage capacitor signal voltage supplied to each of the plurality of storage capacitor bus lines has such a waveform that the polarity thereof changes at least once within one vertical scanning period;
the vertical scanning period includes a plurality of sub-vertical scanning periods; and
the plurality of sub-vertical scanning periods include,
a first sub-vertical scanning period in which interlaced scanning is performed so that either one of pixels along odd-numbered rows and pixels along even-numbered rows are scanned successively; and
a second sub-vertical scanning period in which interlaced scanning is performed so that the other one of the pixels along odd-numbered rows and the pixels along even-numbered rows are scanned successively after the first sub-vertical scanning period.

12. The liquid crystal display device of claim 11, wherein
the source driver is configured so that the polarity of the source signal voltage supplied to each of plurality of source bus lines changes in a predetermined sequence, wherein the sequence includes two consecutive vertical scanning periods differing from each other in terms of the polarity of the source signal voltage or two consecutive sub-vertical scanning periods differing from each other in terms of the polarity of the source signal voltage; and
the control circuit is configured to supply the storage capacitor signal voltages to the storage capacitor bus lines so that at least one of the storage capacitor signal voltages has such a waveform that an effect of increasing or decreasing an effective voltage of one of two sub-pixels of a pixel connected to a $j^{th}$ gate bus line selected in the first sub-vertical scanning period that is associated with the storage capacitor bus line to which the storage capacitor signal voltage is supplied is opposite to an effect of increasing or decreasing an effective voltage of one of two sub-pixels of a pixel connected to a $j+1^{th}$ gate bus line selected in the second sub-vertical scanning period that is associated with the storage capacitor bus line to which the storage capacitor signal voltage is supplied.

13. The liquid crystal display device of claim 12, wherein
the source driver is configured so that the sequence of the source signal voltage includes two consecutive vertical scanning periods differing from each other in terms of the polarity of the source signal voltage, and the first sub-vertical scanning period and the second sub-vertical scanning period, which belong to the same vertical scanning period, are the same in terms of the polarity of the source signal voltage; and
the control circuit is configured so that the polarity of the storage capacitor signal voltage changes an odd number of times during a period from a point in time when a gate signal voltage supplied to the $j^{th}$ gate bus line changes from a high level to a low level in the first sub-vertical scanning period until a point in time when a gate signal voltage supplied to the $j+1^{th}$ gate bus line changes from the high level to the low level in the second sub-vertical scanning period.

14. The liquid crystal display device of claim 12, wherein the source driver is configured so that the sequence of the source signal voltage includes two consecutive sub-vertical scanning periods differing from each other in terms of the polarity of the source signal voltage, and the first sub-vertical scanning period and the second sub-vertical scanning period, which belong to the same vertical scanning period, differ from each other in terms of the polarity of the source signal voltage; and the control circuit is configured so that the polarity of the storage capacitor signal voltage changes an even number of times during a period from a point in time when a gate signal voltage supplied to the $j^{th}$ gate bus line changes from a high level to a low level in the first sub-vertical scanning period until a point in time when a gate signal voltage supplied to the $j+1^{th}$ gate bus line changes from the high level to the low level in the second sub-vertical scanning period.

15. A television set, comprising the liquid crystal display device of claim 1.

16. A liquid crystal display device, comprising:
a plurality of pixels arranged in a matrix pattern of a plurality of rows and a plurality of columns, each pixel including a first sub-pixel and a second sub-pixel capable of exhibiting different brightnesses at least at a certain gray level;
a plurality of source bus lines each associated with pixels along one of the plurality of columns;
a plurality of gate bus lines each associated with pixels along one of the plurality of rows;
a plurality of TFTs each associated with at least one of the first sub-pixel and the second sub-pixel of one of the plurality of pixels; and
a plurality of storage capacitor bus lines each associated at least with one of the first sub-pixel and the second sub-pixel of each pixel along one of the plurality of rows, wherein
each of the first sub-pixel and the second sub-pixel includes a liquid crystal capacitor and a storage capacitor;
a storage capacitor bus line associated with the storage capacitor of the first sub-pixel of one of the plurality of pixels is electrically independent of a storage capacitor bus line associated with the storage capacitor of the second sub-pixel of the pixel;
a source driver configured to supply source signals to the source bus lines so that when polarities of source signal voltages applied to the plurality of source bus lines do not change over a plurality of horizontal scanning periods, an image write pulse of a gate signal supplied to a gate bus line that corresponds to pixels along a $j^{th}$ row rises before the source signal voltages applied to the plurality of source bus lines change to values that correspond to pixels along the $j^{th}$ row;
the source driver configured to supply the source signals to the source bus lines so that after the source signal voltages change to values that correspond to pixels along the $j^{th}$ row, the image write pulse of the gate signal supplied to a gate bus line that corresponds to pixels along the $j^{th}$ row falls, and then the source signal voltages change from values that correspond to pixels along the $j^{th}$ row to values that correspond to pixels along a $k^{th}$ row (j≠k); and
a control circuit configured to supply storage capacitor signal voltages to the storage capacitor bus lines so that polarities of the storage capacitor signal voltages applied to storage capacitor bus lines that correspond to sub-pixels of pixels along the $j^{th}$ row are inverted in synchronism with, or subsequent to, a timing at which the source signal voltages start changing from values that correspond to pixels along the $j^{th}$ row to values that correspond to pixels along the $k^{th}$ row.

17. The liquid crystal display device of claim 16, further comprising:
a gate driver configured to supply gate signals so that wherein an image write pulse of one of the gate signals of a corresponding one of the plurality of gate bus lines rises in synchronism with a fall of a pulse of a gate clock signal, and the image write pulse falls in synchronism with a rise of the next pulse of the gate clock signal.

18. The liquid crystal display device of claim 17, wherein the control circuit is configured to supply the storage capacitor signal voltages to the storage capacitor bus lines so that the polarities of the storage capacitor signal voltages are inverted in synchronism with a data clock signal having a higher frequency than the gate clock signal.

19. The liquid crystal display device of claim 18, further comprising a counting circuit for counting the number of pulses of the data clock signal,
wherein the control circuit is configured to supply the storage capacitor signal voltages to the storage capacitor bus lines so that the polarities of the storage capacitor signal voltages are inverted based on the number of pulses of the data clock signal, which has been counted by the counting circuit since the fall of the next pulse of the gate clock signal.

20. The liquid crystal display device of claim 17, wherein the source driver is configured to supply the source signals to the source bus lines so that the source signal voltages change in synchronism with a fall of a pulse of a latch strobe signal; and
a fall of the pulse of the gate clock signal in synchronism with the rise of the image write pulse of the gate signal corresponding to pixels along the $j^{th}$ row is prior to the fall of the pulse of the latch strobe signal in synchronism with the change of the source signal voltages to values that correspond to pixels along the $j^{th}$ row.

21. The liquid crystal display device of claim 20, wherein the control circuit is configured to supply the storage capacitor signal voltages to the storage capacitor bus lines so that the polarities of the storage capacitor signal voltages applied to storage capacitor bus lines that correspond to sub-pixels of pixels along the $j^{th}$ row are inverted in synchronism with the fall of the pulse of the latch strobe signal in synchronism with the change of the source signal voltages to values that correspond to pixels along the $k^{th}$ row.

22. The liquid crystal display device of claim 17, wherein the control circuit is configured to supply the storage capacitor signal voltages to the storage capacitor bus lines so that the polarities of the storage capacitor signal voltages are inverted in synchronism with a pulse subsequent to the next pulse of the gate clock signal.

23. The liquid crystal display device of claim 16, wherein at least one of the plurality of storage capacitor bus lines is associated with the first sub-pixel of each pixel along a certain one of the plurality of rows and the second sub-pixel of each pixel along another row that is adjacent in a column direction to the certain row.

24. The liquid crystal display device of claim 16, wherein the $k^{th}$ row is a $j+1^{th}$ row.

25. The liquid crystal display device of claim 16, wherein the $k^{th}$ row is a $j+2^{th}$ row.

26. The liquid crystal display device of claim 25, wherein the control circuit is configured to supply the storage capacitor signal voltages to the storage capacitor bus lines so that the storage capacitor signal voltage supplied to each of the plurality of storage capacitor bus lines has such a waveform that the polarity thereof changes at least once within one vertical scanning period;

the vertical scanning period includes a plurality of sub-vertical scanning periods; and the plurality of sub-vertical scanning periods includes:
- a first sub-vertical scanning period in which interlaced scanning is performed so that either one of pixels along odd-numbered rows and pixels along even-numbered rows are scanned successively; and
- a second sub-vertical scanning period in which interlaced scanning is performed so that the other one of the pixels along odd-numbered rows and the pixels along even-numbered rows are scanned successively after the first sub-vertical scanning period.

27. The liquid crystal display device of claim 26, wherein
the source driver is configured so that the polarity of the source signal voltage supplied to each of the plurality of source bus lines changes in a predetermined sequence, wherein the sequence includes two consecutive vertical scanning periods differing from each other in terms of the polarity of the source signal voltage or two consecutive sub-vertical scanning periods differing from each other in terms of the polarity of the source signal voltage; and the control circuit is configured to supply the storage capacitor signal voltages to the storage capacitor bus lines so that at least one of the storage capacitor signal voltages has such a waveform that an effect of increasing or decreasing an effective voltage of one of two sub-pixels of a pixel connected to a $j^{th}$ gate bus line selected in the first sub-vertical scanning period that is associated with the storage capacitor bus line to which the storage capacitor signal voltage is supplied is opposite to an effect of increasing or decreasing an effective voltage of one of two sub-pixels of a pixel connected to a $j+1^{th}$ gate bus line selected in the second sub-vertical scanning period that is associated with the storage capacitor bus line to which the storage capacitor signal voltage is supplied.

28. The liquid crystal display device of claim 27, wherein
the source driver is configured so that the sequence of the source signal voltage includes two consecutive vertical scanning periods differing from each other in terms of the polarity of the source signal voltage, and the first sub-vertical scanning period and the second sub-vertical scanning period, which belong to the same vertical scanning period, are the same in terms of the polarity of the source signal voltage; and the control circuit is configured so that the polarity of the storage capacitor signal voltage changes an odd number of times during a period from a point in time when a gate signal voltage supplied to the $j^{th}$ gate bus line changes from a high level to a low level in the first sub-vertical scanning period until a point in time when a gate signal voltage supplied to the $j+1^{th}$ gate bus line changes from the high level to the low level in the second sub-vertical scanning period.

29. The liquid crystal display device of claim 27, wherein
the source driver is configured so that the sequence of the source signal voltage includes two consecutive sub-vertical scanning periods differing from each other in terms of the polarity of the source signal voltage, and the first sub-vertical scanning period and the second sub-vertical scanning period, which belong to the same vertical scanning period, differ from each other in terms of the polarity of the source signal voltage; and the control circuit is configured so that the polarity of the storage capacitor signal voltage changes an even number of times during a period from a point in time when a gate signal voltage supplied to the $j^{th}$ gate bus line changes from a high level to a low level in the first sub-vertical scanning period until a point in time when a gate signal voltage supplied to the $j+1^{th}$ gate bus line changes from the high level to the low level in the second sub-vertical scanning period.

* * * * *